(12) United States Patent
Iwasaki et al.

(10) Patent No.: US 11,443,762 B2
(45) Date of Patent: Sep. 13, 2022

(54) MAGNETIC HEAD AND MAGNETIC RECORDING DEVICE INCLUDING A STACKED BODY HAVING A FIRST MAGNETIC MEMBER AND A SECOND MAGNETIC MEMBER

(71) Applicants: KABUSHIKI KAISHA TOSHIBA, Tokyo (JP); TOSHIBA ELECTRONIC DEVICES & STORAGE CORPORATION, Tokyo (JP)

(72) Inventors: Hitoshi Iwasaki, Nerima (JP); Naoyuki Narita, Funabashi (JP); Hirofumi Suto, Ota (JP); Masayuki Takagishi, Kunitachi (JP); Tazumi Nagasawa, Yokohama (JP)

(73) Assignees: KABUSHIKI KAISHA TOSHIBA, Tokyo (JP); TOSHIBA ELECTRONIC DEVICES & STORAGE CORPORATION, Tokyo (JP)

(*) Notice: Subject to any disclaimer, the term of this patent is extended or adjusted under 35 U.S.C. 154(b) by 0 days.

(21) Appl. No.: 17/173,279

(22) Filed: Feb. 11, 2021

(65) Prior Publication Data
US 2021/0375309 A1    Dec. 2, 2021

(30) Foreign Application Priority Data
Jun. 1, 2020 (JP) .............................. JP2020-095415

(51) Int. Cl.
*G11B 5/31* (2006.01)
(52) U.S. Cl.
CPC ................................. *G11B 5/3153* (2013.01)
(58) Field of Classification Search
None
See application file for complete search history.

(56) References Cited

U.S. PATENT DOCUMENTS 3,069,974 A * 12/1962 Murks .................. G02B 5/3066
                                                                    359/485.02
2002/0051380 A1    5/2002 Kamiguchi et al.
(Continued)

FOREIGN PATENT DOCUMENTS

JP           63091812 A  *  4/1988  ........... G11B 5/3153
JP       2002-092826 A     3/2002
(Continued)

OTHER PUBLICATIONS

Vouille et al., "Microscopic mechanisms of giant magnetoresistance", Physical Review B, vol. 60, No. 9, 1999, 13 pages.

*Primary Examiner* — William J Klimowicz
(74) *Attorney, Agent, or Firm* — Oblon, McClelland, Maier & Neustadt, L.L.P.

(57) ABSTRACT

According to one embodiment, a magnetic head includes a first magnetic pole, a second magnetic pole, and a stacked body provided between the first and second magnetic poles. The stacked body includes a first magnetic member, a second magnetic member provided between the first magnetic member and the second magnetic pole, a first layer provided between the first and second magnetic members, and a second layer provided between the second magnetic member and the second magnetic pole. The first magnetic member includes first magnetic regions and a first nonmagnetic region. The first nonmagnetic region is between the one of the first magnetic regions and the other one of the first magnetic regions. The second magnetic member includes second magnetic regions and a second nonmagnetic region. The second nonmagnetic region is between the one of the second magnetic regions and the other one of the second magnetic regions.

13 Claims, 12 Drawing Sheets

(56) References Cited

U.S. PATENT DOCUMENTS

| | | | |
|---|---|---|---|
| 2013/0029182 A1* | 1/2013 | Zhang | H01L 43/12 |
| | | | 428/811.1 |
| 2014/0146420 A1 | 5/2014 | Shimizu et al. | |
| 2018/0261241 A1 | 9/2018 | Narita et al. | |

FOREIGN PATENT DOCUMENTS

| | | | | |
|---|---|---|---|---|
| JP | 2014-130672 A | | 7/2014 | |
| JP | 2014123413 A | * | 7/2014 | ........... G11B 5/3146 |
| JP | 2015011745 A | * | 1/2015 | ........... G11B 5/3146 |
| JP | 2016207241 A | * | 12/2016 | ........... G11B 5/314 |
| JP | 2018-147540 A | | 9/2018 | |
| JP | 6414250 B2 | * | 10/2018 | ........... G11B 5/1278 |

* cited by examiner

MAGNETIC HEAD AND MAGNETIC RECORDING DEVICE INCLUDING A STACKED BODY HAVING A FIRST MAGNETIC MEMBER AND A SECOND MAGNETIC MEMBER

CROSS-REFERENCE TO RELATED APPLICATIONS

This application is based upon and claims the benefit of priority from Japanese Patent Application No. 2020-095415, filed on Jun. 1, 2020; the entire contents of which are incorporated herein by reference.

FIELD

Embodiments described herein generally relate to a magnetic head and a magnetic recording device.

BACKGROUND

A magnetic head that uses a stacked body including magnetic layers is provided in a magnetic recording device. Stable operations of the magnetic recording device are desirable.

DETAILED DESCRIPTION

Figure 1:
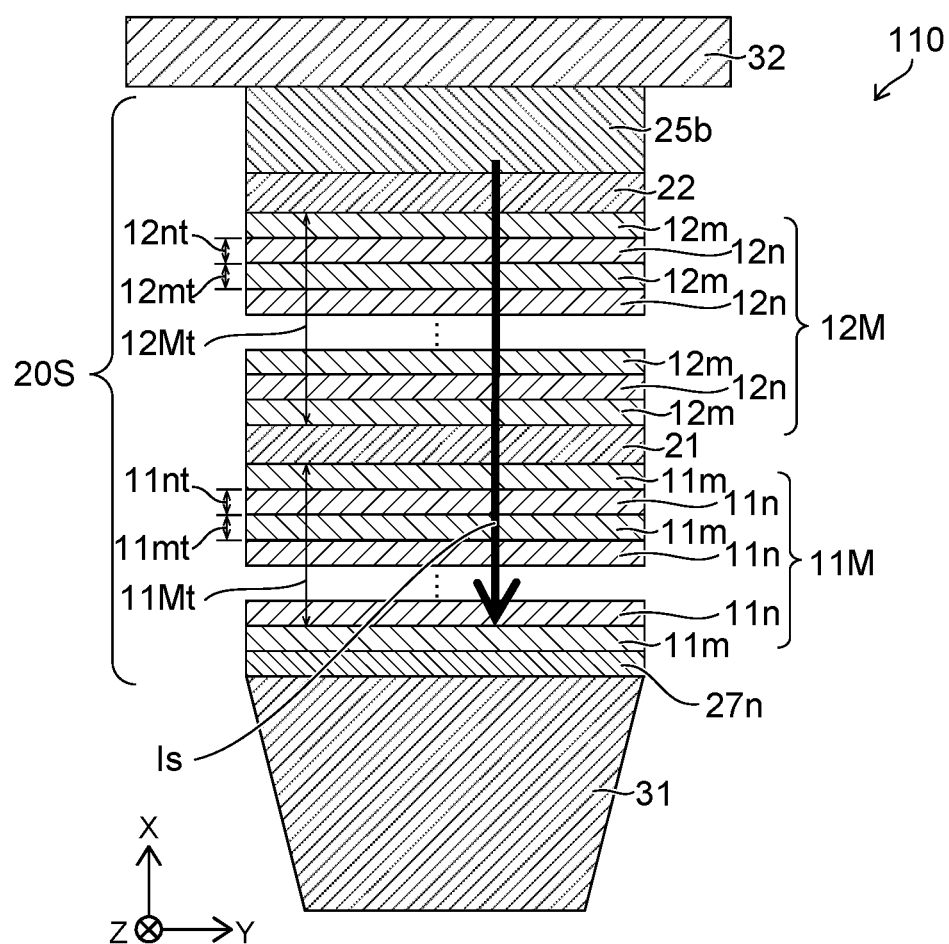
FIG. 1 is a schematic cross-sectional view illustrating a magnetic head according to a first embodiment.

According to one embodiment, a magnetic head includes a first magnetic pole, a second magnetic pole, and a stacked body provided between the first magnetic pole and the second magnetic pole. The stacked body includes a first magnetic member, a second magnetic member provided between the first magnetic member and the second magnetic pole, a first layer provided between the first magnetic member and the second magnetic member, the first layer including Cu, and a second layer provided between the second magnetic member and the second magnetic pole, the second layer including Cu. The first magnetic member includes a plurality of first magnetic regions and a first nonmagnetic region. A direction from one of the first magnetic regions toward an other one of the first magnetic regions is along a first direction from the first magnetic pole toward the second magnetic pole. The first nonmagnetic region is between the one of the first magnetic regions and the other one of the first magnetic regions. The first magnetic regions include a first element. The first element is at least one selected from the group consisting of Fe, Co, and Ni. The first nonmagnetic region includes a second element. The second element is at least one selected from the group consisting of Mn, Cr, V, Ti, and Sc. The first nonmagnetic region does not include Cu. Or a concentration of Cu included in the first nonmagnetic region is less than a concentration of Cu in the first layer. The second magnetic member includes a plurality of second magnetic regions and a second nonmagnetic region. A direction from one of the second magnetic regions toward an other one of the second magnetic regions is along the first direction. The second nonmagnetic region is between the one of the second magnetic regions and the other one of the second magnetic regions. The second magnetic regions include a third element. The third element is at least one selected from the group consisting of Fe, Co, and Ni. The second nonmagnetic region includes a fourth element. The fourth element is at least one selected from the group consisting of Mn, Cr, V, Ti, and Sc. The second nonmagnetic region does not include Cu. Or a concentration of Cu included in the second nonmagnetic region is less than a concentration of Cu in the second layer.

According to one embodiment, a magnetic head includes a first magnetic pole, a second magnetic pole, and a stacked body provided between the first magnetic pole and the second magnetic pole. The stacked body includes a first magnetic member, a second magnetic member provided between the first magnetic member and the second magnetic pole, a first layer provided between the first magnetic member and the second magnetic member, the first layer including Cu, and a second layer provided between the second magnetic member and the second magnetic pole, the second layer including Cu. The first magnetic member includes a plurality of first magnetic regions and a first nonmagnetic region. A direction from one of the first magnetic regions toward an other one of the first magnetic regions is along a first direction from the first magnetic pole toward the second magnetic pole. The first nonmagnetic region is between the one of the first magnetic regions and the other one of the first magnetic regions. The first magnetic regions include a first element. The first element is at least one selected from the group consisting of Fe, Co, and Ni. The first nonmagnetic region includes a second element. The second element is at least one selected from the group consisting of Mn, Cr, V, Ti, and Sc. The first nonmagnetic region does not include Cu. Or a concentration of Cu included in the first nonmagnetic region is less than a concentration of Cu in the first layer. The second magnetic member includes at least one selected from the group consisting of Fe, Co, and Ni.

According to one embodiment, a magnetic recording device includes any one of the magnetic head described above, and an electrical circuit. The electrical circuit is configured to supply a current to the magnetic head. The current has an orientation from the second magnetic member toward the first magnetic member.

Various embodiments are described below with reference to the accompanying drawings.

The drawings are schematic and conceptual; and the relationships between the thickness and width of portions, the proportions of sizes among portions, etc., are not necessarily the same as the actual values. The dimensions and proportions may be illustrated differently among drawings, even for identical portions.

In the specification and drawings, components similar to those described previously or illustrated in an antecedent drawing are marked with like reference numerals, and a detailed description is omitted as appropriate.

First Embodiment

FIG. 1 is a schematic cross-sectional view illustrating a magnetic head according to a first embodiment.

Figure 2:
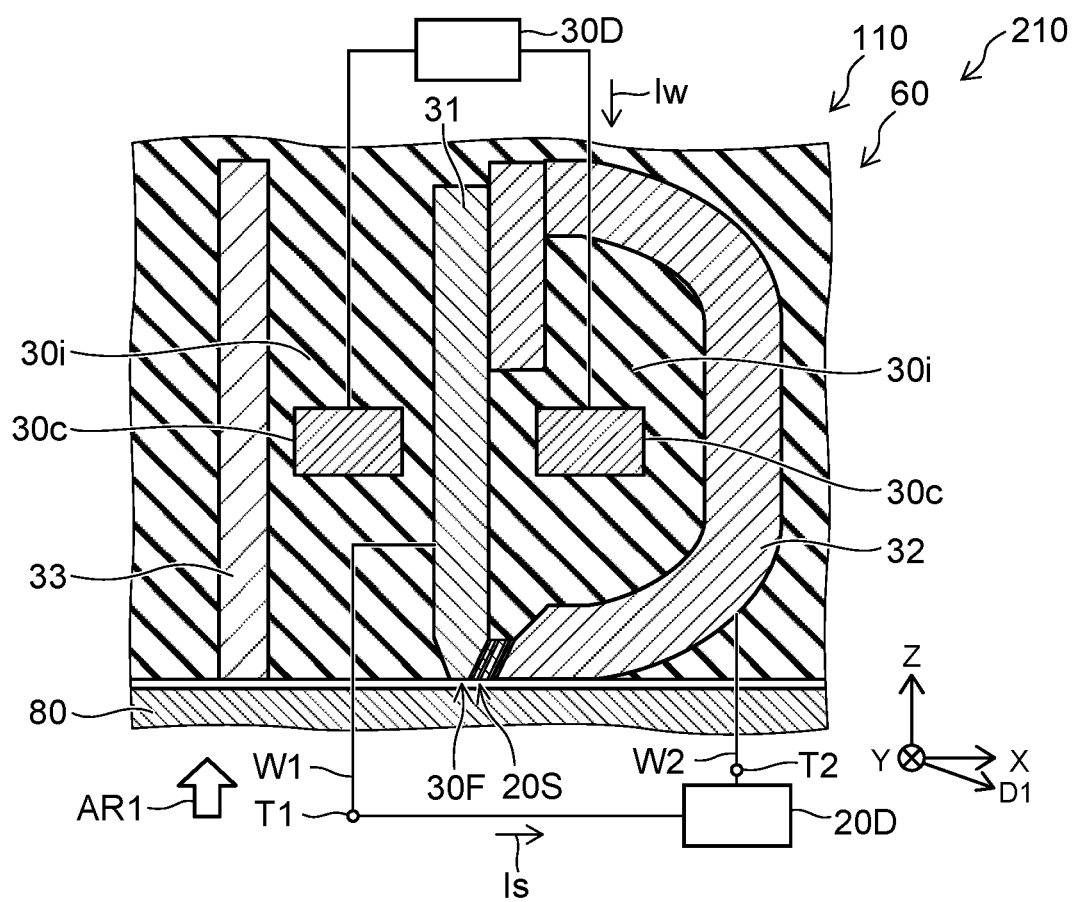
FIG. 2 is a schematic cross-sectional view illustrating a magnetic recording device according to the embodiment.

FIG. 2 is a schematic cross-sectional view illustrating a magnetic recording device according to the embodiment.

As shown in FIG. 2, the magnetic recording device 210 according to the first embodiment includes the magnetic head 110 and an electrical circuit 20D. For example, a recording part 60 is provided in the magnetic head 110. As described below, the magnetic head 110 may include a reproducing part.

The magnetic recording device 210 may include a magnetic recording medium 80. Information is recorded in the magnetic recording medium 80 by the recording part 60 of the magnetic head 110. The magnetic recording medium 80 is, for example, a perpendicular recording medium. An example of the magnetic recording medium 80 is described below.

As shown in FIG. 1, the magnetic head 110 includes a first magnetic pole 31, a second magnetic pole 32, and a stacked body 20S. The stacked body 20S is located between the first magnetic pole 31 and the second magnetic pole 32. The first magnetic pole 31 is, for example, a major magnetic pole. The second magnetic pole 32 is, for example, a trailing shield. According to the embodiment, the second magnetic pole 32 may be the major magnetic pole; and the first magnetic pole 31 may be the trailing shield.

For example, the first magnetic pole 31 and the second magnetic pole 32 form a magnetic circuit. A coil 30c is provided at the first magnetic pole 31 (and/or the second magnetic pole 32). For example, a recording current Iw is supplied from a recording circuit 30D to the coil 30c. A recording magnetic field that corresponds to the recording current Iw flowing in the coil 30c is generated from the first magnetic pole 31. At least a portion of the generated recording magnetic field is oriented toward the magnetic recording medium 80. At least a portion of the recording magnetic field is applied to the magnetic recording medium 80. The orientation of the magnetization of the portion of the magnetic recording medium 80 to which the recording magnetic field is applied is controlled by the recording magnetic field. Thereby, information that corresponds to the orientation of the recording magnetic field is recorded in the magnetic recording medium 80. For example, at least a portion of the recording magnetic field is oriented toward the second magnetic pole 32 after being oriented toward the magnetic recording medium 80.

For example, a direction D1 from the first magnetic pole 31 toward the second magnetic pole 32 is along an X-axis direction. One direction perpendicular to the X-axis direction is taken as a Z-axis direction. A direction perpendicular to the X-axis direction and the Z-axis direction is taken as a Y-axis direction.

A current Is can be supplied to the stacked body 20S. For example, as described below, the current Is is supplied to the stacked body 20S via the first magnetic pole 31 and the second magnetic pole 32.

In one example, an orientation of a magnetization of a magnetic layer included in the stacked body 20S is reversed by the current Is. Thereby, the recording magnetic field is efficiently applied to the magnetic recording medium 80. In another example, the magnetization of a magnetic layer included in the stacked body 20S oscillates due to the current Is. For example, MAMR (Microwave Assisted Magnetic Recording) is performed thereby. According to the first embodiment, an orientation of a magnetization of a magnetic layer included in the stacked body 20S is reversed by the current Is.

As shown in FIG. 2, the first magnetic pole 31 includes a medium-facing surface 30F. The medium-facing surface 30F is, for example, an ABS (Air Bearing Surface). For example, the medium-facing surface 30F faces the magnetic recording medium 80.

For example, a direction perpendicular to the medium-facing surface 30F corresponds to the Z-axis direction. The Z-axis direction is, for example, the height direction. The X-axis direction is, for example, the down-track direction. The Y-axis direction is, for example, the cross-track direction.

As shown in FIG. 2, the electrical circuit 20D is electrically connected to the stacked body 20S. In the example, the stacked body 20S is electrically connected to the first and second magnetic poles 31 and 32. A first terminal T1 and a second terminal T2 are provided in the magnetic head 110. The first terminal T1 is electrically connected to the stacked body 20S via first wiring W1 and the first magnetic pole 31. The second terminal T2 is electrically connected to the stacked body 20S via second wiring W2 and the second magnetic pole 32. The current Is (e.g., a direct current) is supplied from the electrical circuit 20D to the stacked body 20S.

As shown in FIG. 2, a shield 33 may be provided in the recording part 60. The first magnetic pole 31 is located between the shield 33 and the second magnetic pole 32. An insulating portion 30i is provided around the shield 33, the first magnetic pole 31, and the second magnetic pole 32.

FIG. 1 corresponds to a drawing when viewed along arrow AR1 of FIG. 2.

As shown in FIG. 1, the stacked body 20S of the magnetic head 110 includes a first magnetic member 11M, a second magnetic member 12M, a first layer 21, and a second layer 22. The second magnetic member 12M is located between the first magnetic member 11M and the second magnetic pole 32.

The first layer 21 is located between the first magnetic member 11M and the second magnetic member 12M. The first layer 21 includes Cu. The first layer 21 is, for example, a Cu layer. The first layer 21 is a nonmagnetic layer.

The second layer 22 is located between the second magnetic member 12M and the second magnetic pole 32. The second layer 22 includes Cu. The second layer 22 is, for example, a Cu layer. The second layer 22 is a nonmagnetic layer.

The direction from the first magnetic member 11M toward the second magnetic member 12M is taken as a first direction. The first direction is taken as the X-axis direction. For example, the first direction is along the direction D1 illustrated in FIG. 2. For example, the first direction (the X-axis direction) corresponds to the stacking direction. The first layer 21 and the second layer 22 are substantially along the X-Y plane.

As shown in FIG. 1, the first magnetic member 11M includes multiple first magnetic regions 11m and a first nonmagnetic region 11n. The direction from one of the multiple first magnetic regions 11m toward another one of the multiple first magnetic regions 11m is along the first direction from the first magnetic pole 31 toward the second magnetic pole 32. The first direction may be, for example, substantially the X-axis direction.

The first nonmagnetic region 11n is between the one of the multiple first magnetic regions 11m and the other one of the multiple first magnetic regions 11m. Multiple first nonmagnetic regions 11n are provided in the example. One of the multiple first magnetic regions 11m is between one of the multiple first nonmagnetic regions 11n and another one of the multiple first nonmagnetic regions 11n.

The multiple first magnetic regions 11m include a first element that is at least one selected from the group consisting of Fe, Co, and Ni. The multiple first nonmagnetic regions 11n include a second element that is at least one selected from the group consisting of Mn, Cr, V, Ti, and Sc. The first nonmagnetic region 11n does not include Cu. Or, the Cu concentration included in the first nonmagnetic region 11n is less than the Cu concentration in the first layer 21.

The second magnetic member 12M includes multiple second magnetic regions 12m and a second nonmagnetic region 12n. The direction from one of the multiple second magnetic regions 12m toward another one of the multiple second magnetic regions 12m is along the first direction (e.g., the X-axis direction) recited above. The second nonmagnetic region 12n is between the one of the multiple second magnetic regions 12m and the other one of the multiple second magnetic regions 12m. Multiple second nonmagnetic regions 12n are provided in the example. One of the multiple second magnetic regions 12m is between one of the multiple second nonmagnetic regions 12n and another one of the multiple second nonmagnetic regions 12n.

The multiple second magnetic regions 12m include a third element that is at least one selected from the group consisting of Fe, Co, and Ni. The second nonmagnetic region 12n includes a fourth element that is at least one selected from the group consisting of Mn, Cr, V, Ti, and Sc. The second nonmagnetic region 12n does not include Cu. Or, the Cu concentration included in the second nonmagnetic region 12n is less than the Cu concentration in the second layer 22.

In the example, the stacked body 20S further includes a first intermediate nonmagnetic layer 27n and a second-magnetic-pole-side intermediate layer 25b. The first intermediate nonmagnetic layer 27n is between the first magnetic pole 31 and the first magnetic member 11M. The first intermediate nonmagnetic layer 27n includes, for example, at least one selected from the group consisting of Ta, Ru, and Cr. By providing the first intermediate nonmagnetic layer 27n, magnetic coupling between the first magnetic pole 31 and the first magnetic member 11M is substantially blocked.

The second-magnetic-pole-side intermediate layer 25b is located between the second magnetic member 12M and the second magnetic pole 32. The second-magnetic-pole-side intermediate layer 25b includes at least one selected from the group consisting of Fe, Co, and Ni. The second-magnetic-pole-side intermediate layer 25b includes, for example, FeCo. By providing the second-magnetic-pole-side intermediate layer 25b, a magnetization of a magnetic layer included in the stacked body 20S is easily controlled.

The second-magnetic-pole-side intermediate layer 25b contacts and is magnetically coupled with the second magnetic pole 32. The orientation of the magnetization of the second-magnetic-pole-side intermediate layer 25b is the same as the orientation of the magnetization of the second magnetic pole 32. For example, the disturbance of the magnetization of the second-magnetic-pole-side intermediate layer 25b is slight even when receiving spin-transfer torque from the second magnetic member 12M. For example, the magnetization of the second magnetic member 12M stably reverses. For example, the second-magnetic-pole-side intermediate layer 25b has a positive spin polarization. The second magnetic pole 32 may include the function of the second-magnetic-pole-side intermediate layer 25b. In such a case, the second-magnetic-pole-side intermediate layer 25b can be omitted.

In the first magnetic member 11M according to the embodiment, the first nonmagnetic region 11n that includes the second element (e.g., Cr, etc.) is located between the multiple first magnetic regions 11m that include the first element (e.g., Fe, etc.). For example, the multiple first magnetic regions 11m and the multiple first nonmagnetic regions 11n may be alternately provided. Due to such a configuration, the first magnetic member 11M can have large and stable negative spin polarization. The second magnetic member 12M also can have stable negative spin polarization.

For example, in an alloy that includes the first element (e.g., Fe, etc.) and the second element (e.g., Cr), the first and second elements do not form a solid solution in the equilibrium state. In the alloy, there is a tendency for the alloy to be separated into a mixture of regions (e.g., grains) that include the first element and regions (e.g., grains) that include the second element. Negative spin polarization easily occurs when the regions (e.g., the grains) that include the first element are small. For example, the negative spin polarization is combined at the interface between Fe and Cr. Negative spin polarization is easily caused thereby.

On the other hand, when heat or the like is applied, the spin polarization easily becomes positive. It is considered that this is because the applied heat increases the sizes of the regions (e.g., the grains) including the first element and increases the distance between the multiple regions including the first element. For example, positive spin polarization is increased by the Fe grains becoming larger. The amount (the surface area per unit volume) of the interface between Fe and Cr decreases, and the negative spin polarization at the interface between Fe and Cr decreases.

Thus, in an alloy that includes the first element (e.g., Fe, etc.) and the second element (e.g., Cr), the polarity of the spin polarization changes in the heat treatment, etc.; and the spin polarization easily becomes positive.

Conversely, according to the embodiment, for example, the first nonmagnetic region 11n that includes the second element is alternately arranged between two first magnetic regions 11m that include the first element (e.g., Fe, etc.). For example, the first magnetic region 11m has a layer configuration; and the first nonmagnetic region 11n has a layer configuration. Therefore, these regions are stable even when heat treatment is performed. Mixing of these regions can be suppressed. By setting the thickness of the first magnetic region 11m to be sufficiently thin, negative spin polarization is maintained. The interface between the first magnetic region 11m and the first nonmagnetic region 11n is stable and can exist with a high density. By setting the thickness of the first nonmagnetic region 11n to be sufficiently thin, the magnetizations of the multiple first magnetic regions 11m that are next to each other become continuous. Therefore, for example, the first magnetic member 11M can have stable negative spin polarization. Similarly, the second magnetic member 12M can have stable negative spin polarization.

According to the embodiment, such a first magnetic member 11M, such a second magnetic member 12M, the first layer 21, and the second layer 22 are combined. When the current Is is supplied to the stacked body 20S, for example, the first magnetic member 11M functions as, for example, a spin injection layer. The magnetization of the second magnetic member 12M reverses. Because the magnetization of the magnetic member included in the stacked body 20S reverses, the recording magnetic field that is emitted from the first magnetic pole 31 does not easily pass through the stacked body 20S. As a result, the recording magnetic field is effectively applied to the magnetic recording medium 80. For example, the recording magnetic field is effectively applied to the magnetic recording medium 80 even when the recording gap (the distance between the first magnetic pole 31 and the second magnetic pole 32) is small.

The first magnetic member 11M is, for example, a negative spin injection layer. In such a case, the positive spin injection from the second magnetic pole 32 (or the second-magnetic-pole-side intermediate layer 25b) and the negative spin injection from the first magnetic member 11M are superimposed. For example, when the first magnetic member 11M has positive spin polarization, the positive spin injection from the second magnetic pole 32 (or the second-magnetic-pole-side intermediate layer 25b) and the positive spin injection from the first magnetic member 11M act to cancel each other. According to the embodiment, by using a first magnetic member 11M such as that described above, the magnetization of the second magnetic member 12M is effectively reversed.

According to the embodiment, even after heat treatment or the like is performed, the magnetic characteristics of the first magnetic member 11M and the second magnetic member 12M are stable; and high heat resistance is obtained. According to the embodiment, a magnetic head can be provided in which stable operations are possible.

According to the embodiment, the length (a first magnetic region thickness 11mt) along the first direction (the X-axis direction) of one of the multiple first magnetic regions 11m is, for example, not less than 0.15 nm and not more than 1.5 nm. The length (a first nonmagnetic region thickness 11nt) along the first direction of the first nonmagnetic region 11n is, for example, not less than 0.15 nm and not more than 1.5 nm. Because the first magnetic region thickness 11mt is not less than 0.15 nm (e.g., the thickness of a monatomic layer), for example, the first magnetic region 11m easily becomes a ferromagnetic film. Because the first magnetic region thickness 11mt is not more than 1.5 nm, for example, large negative spin polarization is easily obtained. Because the first nonmagnetic region thickness 11nt is not less than 0.15 nm (e.g., the thickness of a monatomic layer), for example, negative spin polarization easily occurs due to the first nonmagnetic region 11n. Because the first nonmagnetic region thickness 11nt is not more than 1.5 nm, a high density of the interface between the first magnetic region 11m and the first nonmagnetic region 11n is easily maintained. Because the first nonmagnetic region thickness 11nt is not more than 1.5 nm, for example, the magnetic coupling between the multiple first magnetic regions 11m that are next to each other is easily stabilized.

According to the embodiment, practically, for example, the distance (the full width at half maximum) along the first direction between two positions of ½ of the peak value of the first element in one of the multiple first magnetic regions 11m may be used as the first magnetic region thickness 11mt. Practically, for example, the distance (the full width at half maximum) along the first direction between two positions of ½ of the peak value of the second element in one of the multiple first nonmagnetic regions 11n may be used as the first nonmagnetic region thickness 11nt.

According to the embodiment, the length (a second magnetic region thickness 12mt) along the first direction (the X-axis direction) of one of the multiple second magnetic regions 12m is, for example, not less than 0.15 nm and not more than 1.5 nm. The length (a second nonmagnetic region thickness 12nt) along the first direction of the second nonmagnetic region 12n is, for example, not less than 0.15 nm and not more than 1.5 nm.

Because the second magnetic region thickness 12mt is not less than 0.15 nm (e.g., the thickness of a monatomic layer), for example, the second magnetic region 12m easily becomes a ferromagnetic film. Because the second magnetic region thickness 12mt is not more than 1.5 nm, for example, large negative spin polarization is easily obtained. Because the second nonmagnetic region thickness 12nt is not less than 0.15 nm (e.g., the thickness of a monatomic layer), for example, negative spin polarization easily occurs due to the second nonmagnetic region 12n. Because the second nonmagnetic region thickness 12nt is not more than 1.5 nm, a high density of the interface between the second magnetic region 12m and the second nonmagnetic region 12n is easily maintained. Because the second nonmagnetic region thickness 12nt is not more than 1.5 nm, for example, the magnetic coupling between the multiple second magnetic regions 12m that are next to each other is easily stabilized.

According to the embodiment, practically, for example, the distance (the full width at half maximum) along the first direction between two positions of ½ of the peak value of the third element in one of the multiple second magnetic regions 12m may be used as the second magnetic region thickness 12mt. Practically, for example, the distance (the full width at half maximum) along the first direction between two positions of ½ of the peak value of the fourth element in one of the multiple second nonmagnetic regions 12n may be used as the second nonmagnetic region thickness 12nt.

According to the embodiment, the multiple first magnetic regions 11m substantially do not include the second element (at least one selected from the group consisting of Mn, Cr, V, Ti, and Sc). Or, the concentration of the second element included in the multiple first magnetic regions 11m is less than the concentration of the second element in the first nonmagnetic region 11n.

The first nonmagnetic region 11n substantially does not include the first element (at least one selected from the group consisting of Fe, Co, and Ni). Or, the concentration of the first element included in the first nonmagnetic region 11n is less than the concentration of the first element in the multiple first magnetic regions 11m.

The multiple second magnetic regions 12m substantially do not include the fourth element (at least one selected from the group consisting of Mn, Cr, V, Ti, and Sc). Or, the concentration of the fourth element included in the multiple second magnetic regions 12m is less than the concentration of the fourth element in the second nonmagnetic region 12n.

The second nonmagnetic region 12n substantially does not include the third element (at least one selected from the group consisting of Fe, Co, and Ni). Or, the concentration of the third element included in the second nonmagnetic region 12n is less than the concentration of the third element in the multiple second magnetic regions 12m.

As shown in FIG. 1, the thickness (a first magnetic member thickness 11Mt) along the first direction (the X-axis direction) of the first magnetic member 11M is less than the thickness (a second magnetic member thickness 12Mt) along the first direction of the second magnetic member 12M. In such a case, the current Is that is supplied to the stacked body 20S effectively reverses a magnetization of a magnetic member included in the stacked body 20S by having the orientation from the second magnetic member 12M toward the first magnetic member 11M.

The first magnetic member thickness 11Mt is, for example, not less than 1.5 times and not more than 5 times the second magnetic member thickness 12Mt. For example, the magnetization of the first magnetic member 11M is reversed by spin-transfer torque from the second magnetic member 12M. On the other hand, the magnetization of the second magnetic member 12M is reversed by spin-transfer torque from the first magnetic member 11M and spin-transfer torque of the second magnetic pole 32 (or the second-magnetic-pole-side intermediate layer 25b). The magnetization of the second magnetic member 12M can be reversed even when the second magnetic member 12M is thicker than the first magnetic member 11M. For example, the magnetization reversal volume of the combination of the first magnetic member 11M and the second magnetic member 12M can be increased. For example, the recording capacity improves.

According to the embodiment, the thickness along the first direction (the X-axis direction) of the first layer 21 is, for example, not less than 1 nm and not more than 4 nm. The thickness along the first direction (the X-axis direction) of the second layer 22 is, for example, not less than 1 nm and not more than 4 nm. By such thicknesses, for example, the control of the magnetizations of the magnetic members can be stably performed.

The first intermediate nonmagnetic layer 27n may be provided as described above. The thickness along the first direction (the X-axis direction) of the first intermediate nonmagnetic layer 27n is, for example, not less than 1 nm and not more than 7 nm. By such a thickness, the magnetic coupling between the first magnetic pole 31 and the first magnetic member 11M can be stably blocked.

Figure 3:
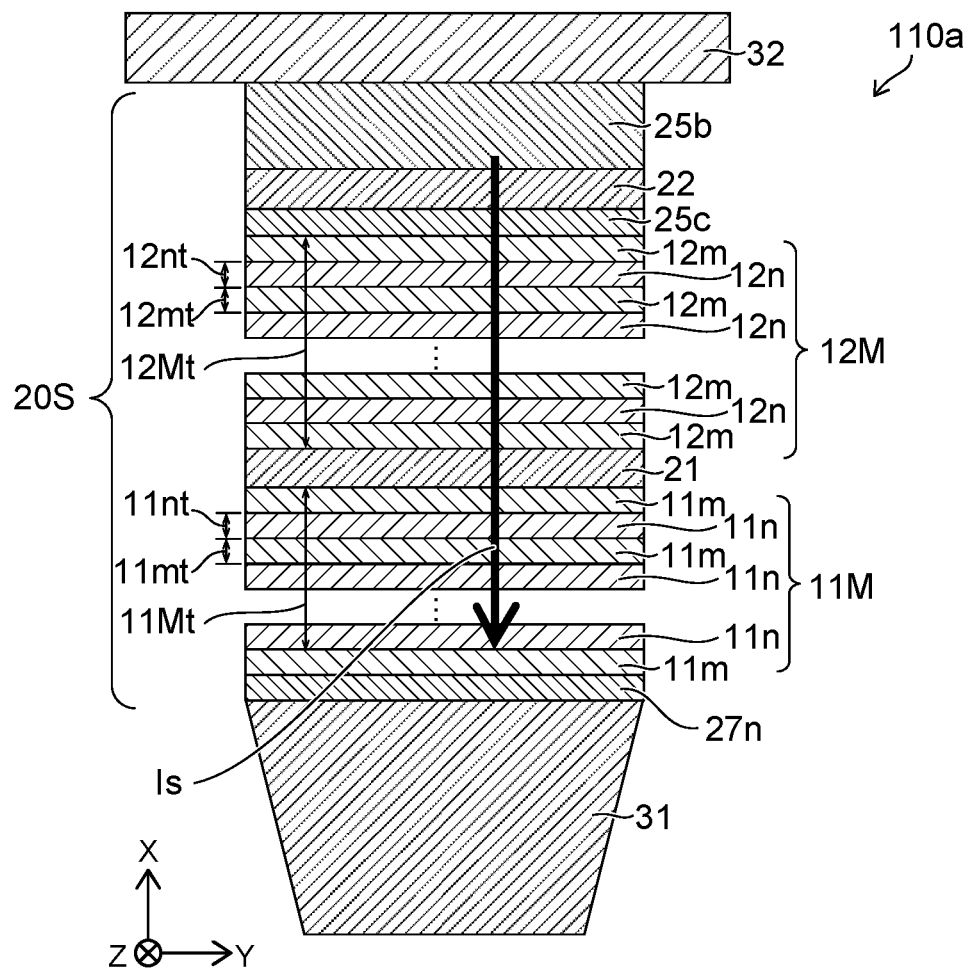
FIG. 3 is a schematic cross-sectional view illustrating a magnetic head according to the first embodiment.

FIG. 3 is a schematic cross-sectional view illustrating a magnetic head according to the first embodiment.

In the magnetic head 110a according to the embodiment as shown in FIG. 3, the stacked body 20S includes a magnetic intermediate layer 25c in addition to the first magnetic member 11M, the second magnetic member 12M, the first layer 21, and the second layer 22. The configuration of the first magnetic member 11M, the second magnetic member 12M, the first layer 21, and the second layer 22 of the magnetic head 110a may be similar to that of the magnetic head 110. An example of the magnetic intermediate layer 25c will now be described.

The magnetic intermediate layer 25c is located between the second magnetic member 12M and the second layer 22. The magnetic intermediate layer 25c includes, for example, the first element that is at least one selected from the group consisting of Fe, Co, and Ni. For example, the magnetic intermediate layer 25c has positive spin polarization. By providing the magnetic intermediate layer 25c, for example, the magnetization of the second-magnetic-pole-side intermediate layer 25b is easily stabilized. For example, the material of the magnetic intermediate layer 25c may have a weaker negative spin polarization than the second magnetic member 12M. The intermediate layer 25c may be, for example, an Fe layer. The intermediate layer 25c may be, for example, an alloy layer that includes Fe and Cr. The Cr composition ratio in the alloy is not more than 30 at %. The intermediate layer 25c may be, for example, a NiFe alloy layer.

Figure 4:
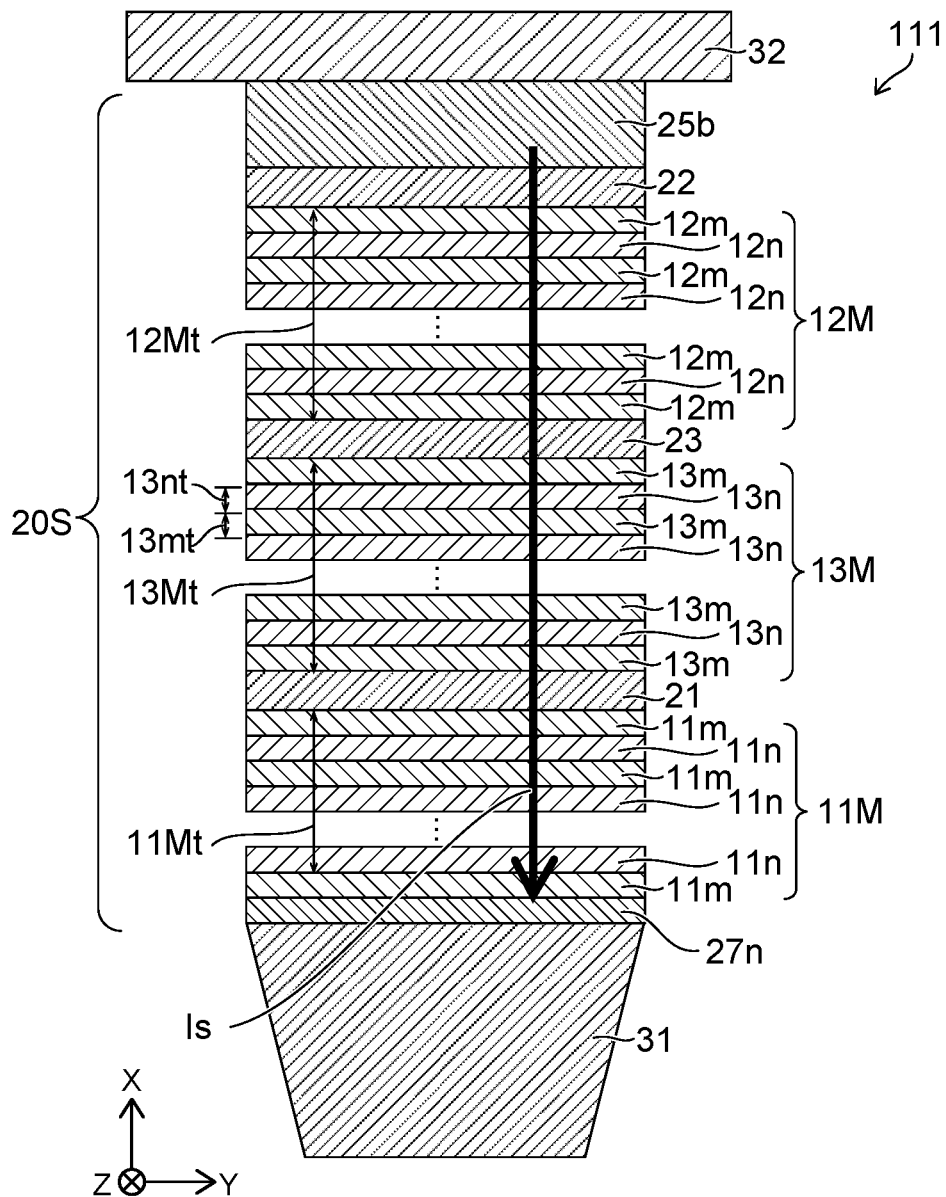
FIG. 4 is a schematic cross-sectional view illustrating a magnetic head according to the first embodiment.

FIG. 4 is a schematic cross-sectional view illustrating a magnetic head according to the first embodiment.

In the magnetic head 111 according to the embodiment as shown in FIG. 4, the stacked body 20S includes a third magnetic member 13M and a third layer 23 in addition to the first magnetic member 11M, the second magnetic member 12M, the first layer 21, and the second layer 22. The configuration of the first magnetic member 11M, the second magnetic member 12M, the first layer 21, and the second layer 22 of the magnetic head 111 may be similar to that of the magnetic head 110. Examples of the third magnetic member 13M and the third layer 23 will now be described.

The third magnetic member 13M is located between the first layer 21 and the second magnetic member 12M. The third layer 23 is located between the third magnetic member 13M and the second magnetic member 12M. The third layer 23 includes Cu. The third layer 23 may be, for example, a Cu layer.

The third magnetic member 13M includes multiple third magnetic regions 13m and a third nonmagnetic region 13n. The direction from one of the multiple third magnetic regions 13m toward another one of the multiple third magnetic regions 13m is along the first direction (e.g., the X-axis direction). The third nonmagnetic region 13n is between the one of the multiple third magnetic regions 13m and the other one of the multiple third magnetic regions 13m. Multiple third nonmagnetic regions 13n are provided in the example. The one of the multiple third magnetic regions 13m is between one of the multiple third nonmagnetic regions 13n and another one of the multiple third nonmagnetic regions 13n.

The multiple third magnetic regions 13m include a fifth element that is at least one selected from the group consisting of Fe, Co, and Ni. The third nonmagnetic region 13n (which may be, for example, one of the multiple third nonmagnetic regions 13n) includes a sixth element that is at least one selected from the group consisting of Mn, Cr, V, Ti, and Sc.

The third nonmagnetic region 13n does not include Cu. Or, the Cu concentration included in the third nonmagnetic region 13n is less than the Cu concentration in the third layer 23.

For example, the third layer 23 substantially does not include the sixth element described above. Or, the concentration of the sixth element in the third layer 23 is less than the concentration of the sixth element in the third nonmagnetic region 13n.

For example, the multiple third magnetic regions 13m do not include the sixth element (at least one selected from the group consisting of Mn, Cr, V, Ti, and Sc). Or, the concentration of the sixth element included in the multiple third magnetic regions 13m is less than the concentration of the sixth element in the third nonmagnetic region 13n.

The third nonmagnetic region 13n does not include the fifth element (at least one selected from the group consisting of Fe, Co, and Ni). The concentration of the first element included in the third nonmagnetic region 13n is less than the concentration of the fifth element in the multiple third magnetic regions 13m.

In the magnetic head 111 that includes such a third magnetic member 13M as well, a magnetization of a magnetic member included in the stacked body 20S is stably reversed by supplying the current Is. In the magnetic head 111 as well, the recording magnetic field is effectively applied to the magnetic recording medium 80. For example, the recording magnetic field is effectively applied to the magnetic recording medium 80 even when the recording gap is small. Even after performing heat treatment, etc., the magnetic characteristics of the first magnetic member 11M, the second magnetic member 12M, and the third magnetic member 13M are stable; and high heat resistance is obtained. According to the embodiment, a magnetic head can be provided in which stable operations are possible.

In the magnetic head 111 as well, for example, the first magnetic member thickness 11Mt is less than the second magnetic member thickness 12Mt. The current Is that is supplied to the stacked body 20S has an orientation from the second magnetic member 12M toward the first magnetic member 11M. In the magnetic head 111 as well, the first intermediate nonmagnetic layer 27n may be provided. The first intermediate nonmagnetic layer includes at least one selected from the group consisting of Ta, Ru, and Cr. The thickness along the first direction (e.g., the X-axis direction) of the first intermediate nonmagnetic layer 27n is, for example, not less than 1 nm and not more than 7 nm.

Figure 5:
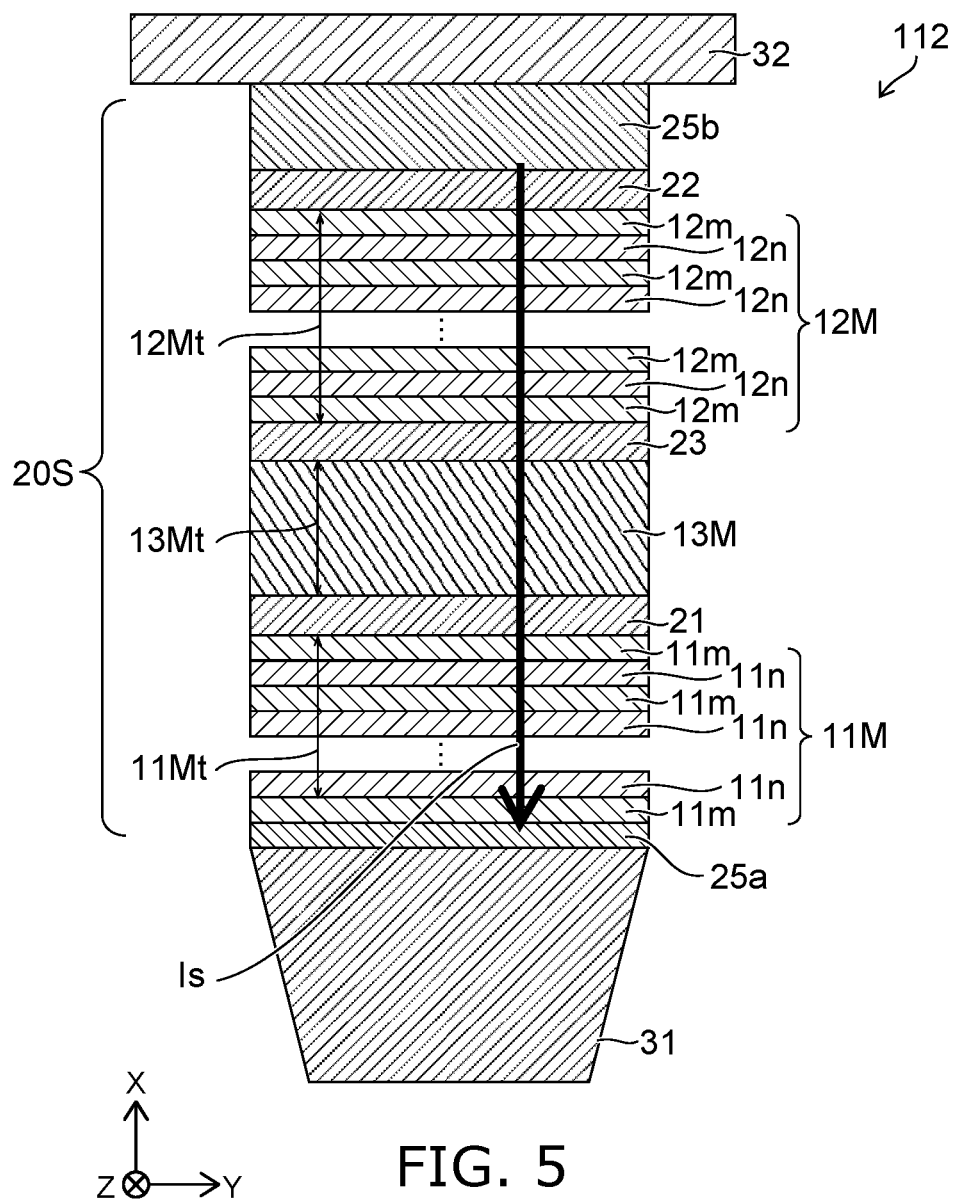
FIG. 5 is a schematic cross-sectional view illustrating a magnetic head according to the first embodiment.

FIG. 5 is a schematic cross-sectional view illustrating a magnetic head according to the first embodiment.

In the magnetic head 112 according to the embodiment as shown in FIG. 5, the stacked body 20S includes the third magnetic member 13M and the third layer 23 in addition to the first magnetic member 11M, the second magnetic member 12M, the first layer 21, and the second layer 22. The configuration of the first magnetic member 11M, the second magnetic member 12M, the first layer 21, and the second layer 22 of the magnetic head 112 may be similar to that of the magnetic head 110. Examples of the third magnetic member 13M and the third layer 23 of the magnetic head 112 will now be described.

In the magnetic head 112 as well, the third magnetic member 13M is located between the first layer 21 and the second magnetic member 12M. The third layer 23 is located between the third magnetic member 13M and the second magnetic member 12M and includes Cu.

The third magnetic member 13M includes at least one selected from the group consisting of Fe, Co, and Ni. The third magnetic member 13M substantially does not include the second element (at least one selected from the group consisting of Mn, Cr, V, Ti, and Sc). Or, the concentration of the second element included in the third magnetic member 13M is less than the concentration of the second element in the first nonmagnetic region 11n.

In the magnetic head 112, the third magnetic member 13M has positive spin polarization. In the magnetic head 112 as well, a magnetization of a magnetic member included in the stacked body 20S is reversed by supplying the current Is. The recording magnetic field is effectively applied to the magnetic recording medium 80. In the magnetic head 112 as well, a magnetic head can be provided in which stable operations are possible.

In the magnetic head 112 as shown in FIG. 5, the stacked body 20S includes a first-magnetic-pole-side intermediate layer 25a. The first-magnetic-pole-side intermediate layer 25a is located between the first magnetic pole 31 and the first magnetic member 11M. The first-magnetic-pole-side intermediate layer 25a includes, for example, at least one selected from the group consisting of a first material, a second material, and a third material. The first material includes an amorphous magnetic substance. The second material includes at least one selected from the group consisting of Ni and Co. The third material includes at least one selected from the group consisting of Fe, Co, and Ni and includes at least one selected from the group consisting of Pd, Pt, Ir, Ta, Ru, Rh, Mo, W, Zr, Hf, and Nb. The first-magnetic-pole-side intermediate layer 25a is, for example, a magnetic layer. By providing such a first-magnetic-pole-side intermediate layer 25a, for example, the magnetic coupling between the first magnetic pole 31 and the first magnetic member 11M is easily maintained. For example, stable reversals of the magnetizations due to the current Is are easily obtained. For example, the orientation of the magnetization of the first magnetic member 11M can easily be the same as the orientation of the magnetization of the first magnetic pole 31. For example, the transfer of the spin polarization information between the first magnetic member 11M and the first magnetic pole 31 can be attenuated. For example, the reduction of the negative spin polarization of the first magnetic member 11M due to the positive spin polarization of the first magnetic pole 31 can be suppressed.

The thickness along the first direction (the X-axis direction) of the first-magnetic-pole-side intermediate layer 25a is, for example, not less than 1 nm and not more than 7 nm.

In the magnetic head 112 as well, for example, the first magnetic member thickness 11Mt is less than the second magnetic member thickness 12Mt. The current Is that is supplied to the stacked body 20S has an orientation from the second magnetic member 12M toward the first magnetic member 11M. A stable magnetization reversal is obtained.

Second Embodiment

Figure 6:
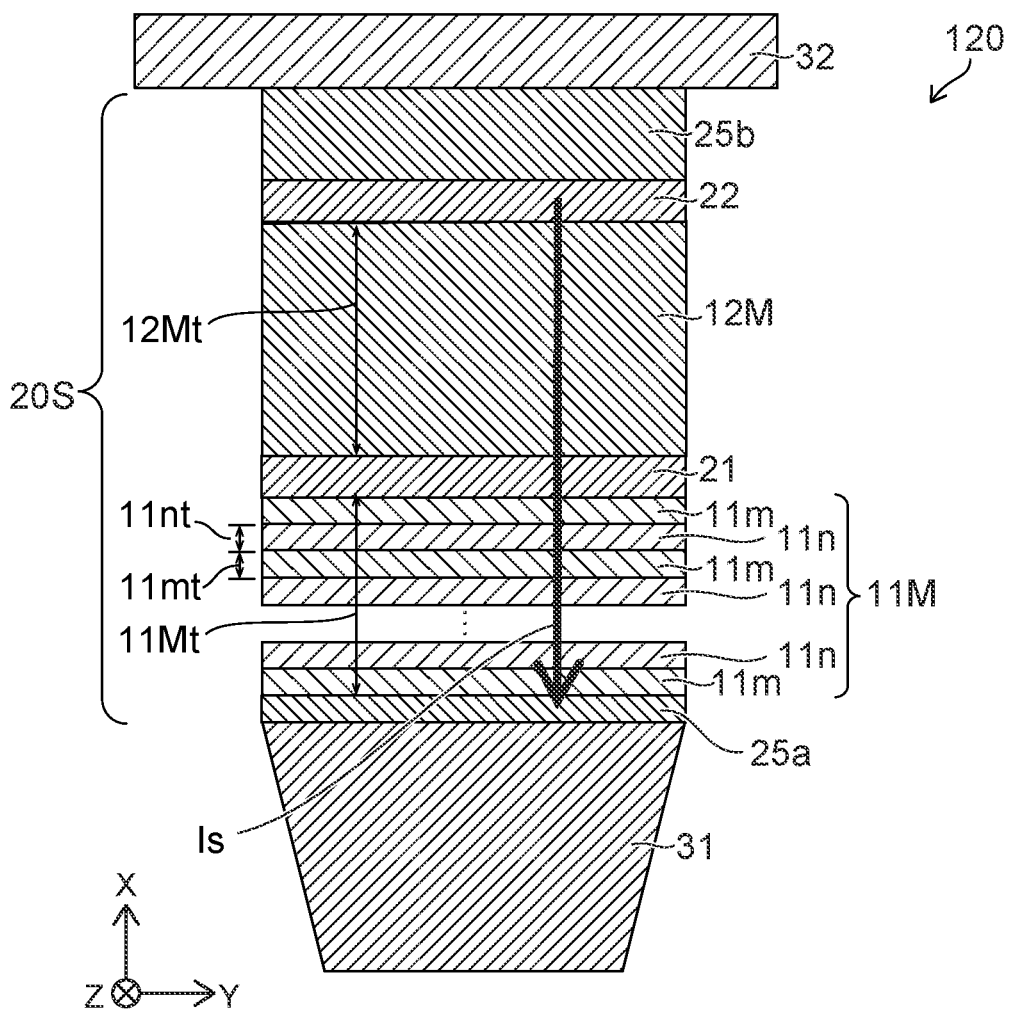
FIG. 6 is a schematic cross-sectional view illustrating a magnetic head according to a second embodiment.

FIG. 6 is a schematic cross-sectional view illustrating a magnetic head according to a second embodiment.

As shown in FIG. 6, the magnetic head 120 according to the embodiment also includes the first magnetic pole 31, the second magnetic pole 32, and the stacked body 20S. The stacked body 20S is located between the first magnetic pole 31 and the second magnetic pole 32. The magnetic recording medium 80, the electrical circuit 20D, the recording circuit 30D, etc., may be used for the magnetic head 120 as well. The magnetic head 120 is a portion of the magnetic recording device 210 (referring to FIG. 2). The first magnetic pole 31, the second magnetic pole 32, and the stacked body 20S are included in the recording part 60 (referring to FIG. 2).

As shown in FIG. 6, the stacked body 20S includes the first magnetic member 11M, the second magnetic member 12M, the first layer 21, and the second layer 22. The second magnetic member 12M is located between the first magnetic member 11M and the second magnetic pole 32. The first layer 21 is located between the first magnetic member 11M and the second magnetic member 12M. The first layer 21 includes Cu. The first layer 21 is, for example, a Cu layer. The second layer 22 is located between the second magnetic member 12M and the second magnetic pole 32. The second layer 22 includes Cu. The second layer 22 is, for example, a Cu layer.

The first magnetic member 11M includes the multiple first magnetic regions 11m and the first nonmagnetic region 11n. The direction from one of the multiple first magnetic regions 11m toward another one of the multiple first magnetic regions 11m is along the first direction (e.g., the X-axis direction) from the first magnetic pole 31 toward the second magnetic pole 32. The first nonmagnetic region 11n is between one of the multiple first magnetic regions 11m and another one of the multiple first magnetic regions 11m.

Multiple first nonmagnetic regions 11n are provided in the example as shown in FIG. 6. One of the multiple first magnetic regions 11m is between one of the multiple first nonmagnetic regions 11n and another one of the multiple first nonmagnetic regions 11n.

The multiple first magnetic regions 11n include the first element that is at least one selected from the group consisting of Fe, Co, and Ni. The first nonmagnetic region 11n (which may be, for example, one of the multiple first nonmagnetic regions 11n) includes the second element that is at least one selected from the group consisting of Mn, Cr, V, Ti, and Sc. The first nonmagnetic region 11n does not include Cu. Or, the Cu concentration included in the first nonmagnetic region 11n is less than the Cu concentration in the first layer 21. Similarly to the description of the first embodiment, for example, the first magnetic member 11M has negative spin polarization.

The second magnetic member 12M includes at least one selected from the group consisting of Fe, Co, and Ni. For example, the second magnetic member 12M has positive spin polarization.

For example, the first magnetic member 11M functions as a spin injection layer. For example, the second magnetic member 12M functions as an oscillation generation layer. The stacked body 20S functions as at least a portion of a spin torque oscillator.

As shown in FIG. 6, the thickness (the first magnetic member thickness 11Mt) along the first direction (e.g., the X-axis direction) of the first magnetic member 11M is less than the thickness (the second magnetic member thickness 12Mt) along the first direction of the second magnetic member 12M. For example, the current Is is supplied from the electrical circuit 20D to the stacked body 20S. The current Is has an orientation from the second magnetic member 12M toward the first magnetic member 11M.

The magnetization of the second magnetic member 12M oscillates due to such a current Is. An alternating current magnetic field is generated from the stacked body 20S. The alternating current magnetic field is applied to a designated region of the magnetic recording medium 80. The orientation of the magnetization in the designated region to which the alternating current magnetic field is applied is easily changed locally. For example, MAMR is performed.

According to the embodiment, negative spin polarization is stably obtained in the first magnetic member 11M. A stable oscillation can be obtained thereby, and stable MAMR can be performed. For example, when the current Is that is not less than a threshold is supplied to the stacked body 20S, the SNR (Signal-to-Noise Ratio) is greater than when the current is not supplied. According to the embodiment, by performing MAMR, a high SNR can be maintained and stable operations are obtained even when the recording density is increased. According to the second embodiment as well, a magnetic head and a magnetic recording device can be provided in which stable operations are possible.

In a spin torque oscillator of a reference example, two magnetic layers that have positive spin polarization are used. When the reference example is provided between the first magnetic pole 31 and the second magnetic pole 32, the oscillations (the magnetization reversal characteristics) due to the spin-transfer torque are suppressed by the spin injection of the positive spin polarization. The spin-transfer torques act to cancel each other in the reference example.

Conversely, according to the embodiment, a synergistic effect of the positive spin injection from the first and second magnetic poles 31 and 32 is caused by the spin injection by the first magnetic member 11M that has negative spin polarization. The spin-transfer torque due to the first magnetic member 11M and the spin-transfer torque from the first and second magnetic poles 31 and 32 are combined, and a large spin-transfer torque is obtained. According to the embodiment, for example, at least one of the first magnetic pole 31 or the second magnetic pole 32 is utilized as a portion of a spin torque oscillator. According to the embodiment, good oscillation characteristics are obtained.

In the magnetic head 120, the multiple first magnetic regions 11m substantially do not include the second element (at least one selected from the group consisting of Mn, Cr, V, Ti, and Sc). Or, the concentration of the second element included in the multiple first magnetic regions 11m is less than the concentration of the second element in the first nonmagnetic region 11n.

In the magnetic head 120, the first nonmagnetic region 11n substantially does not include the first element (at least one selected from the group consisting of Fe, Co, and Ni). Or, the concentration of the first element included in the first nonmagnetic region 11n is less than the concentration of the first element in the multiple first magnetic regions 11m.

In the magnetic head 120, the second magnetic member 12M substantially does not include the second element (at least one selected from the group consisting of Mn, Cr, V, Ti, and Sc). Or, the concentration of the second element included in the second magnetic member 12M is less than the concentration of the second element in the first nonmagnetic region 11n.

As shown in FIG. 6, the stacked body 20S may include the first-magnetic-pole-side intermediate layer 25a. The first-magnetic-pole-side intermediate layer 25a is located between the first magnetic pole 31 and the first magnetic member 11M. The first-magnetic-pole-side intermediate layer 25a includes, for example, at least one selected from the group consisting of the first material, the second material, and the third material. The first material includes the amorphous magnetic substance. The second material includes at least one selected from the group consisting of Ni and Co. The third material includes at least one selected from the group consisting of Fe, Co, and Ni and includes at least one selected from the group consisting of Pt, Pd, Ir, Ta, Ru, Rh, Mo, W, Zr, Hf, and Nb. By providing such a first-magnetic-pole-side intermediate layer 25a, for example, the magnetic coupling between the first magnetic pole 31 and the first magnetic member 11M is effectively blocked.

The thickness along the first direction (e.g., the X-axis direction) of the first-magnetic-pole-side intermediate layer 25a is, for example, not less than 1 nm and not more than 7 nm.

As shown in FIG. 6, the stacked body 20S may include the second-magnetic-pole-side intermediate layer 25b. The second-magnetic-pole-side intermediate layer 25b is located between the second magnetic member 12M and the second magnetic pole 32. The second-magnetic-pole-side intermediate layer 25b includes at least one selected from the group consisting of Fe, Co, and Ni. For example, the second-magnetic-pole-side intermediate layer 25b has positive spin polarization. By providing the second-magnetic-pole-side intermediate layer 25b, for example, the magnetizations can be stably controlled. For example, a stable oscillation is easily obtained. For example, the second-magnetic-pole-side intermediate layer 25b contacts and is magnetically coupled with the second magnetic pole 32. For example, the orientation of the magnetization of the second-magnetic-pole-side intermediate layer 25b is the same as the orientation of the magnetization of the second magnetic pole 32. The disturbance of the orientation of the magnetization of the second-magnetic-pole-side intermediate layer 25b is slight even when receiving spin-transfer torque from the second magnetic member 12M. For example, a stable oscillation is easily obtained in the second magnetic member 12M. The second magnetic pole 32 may have the function of the second-magnetic-pole-side intermediate layer 25b. In such a case, the second-magnetic-pole-side intermediate layer 25b can be omitted.

Figure 7:
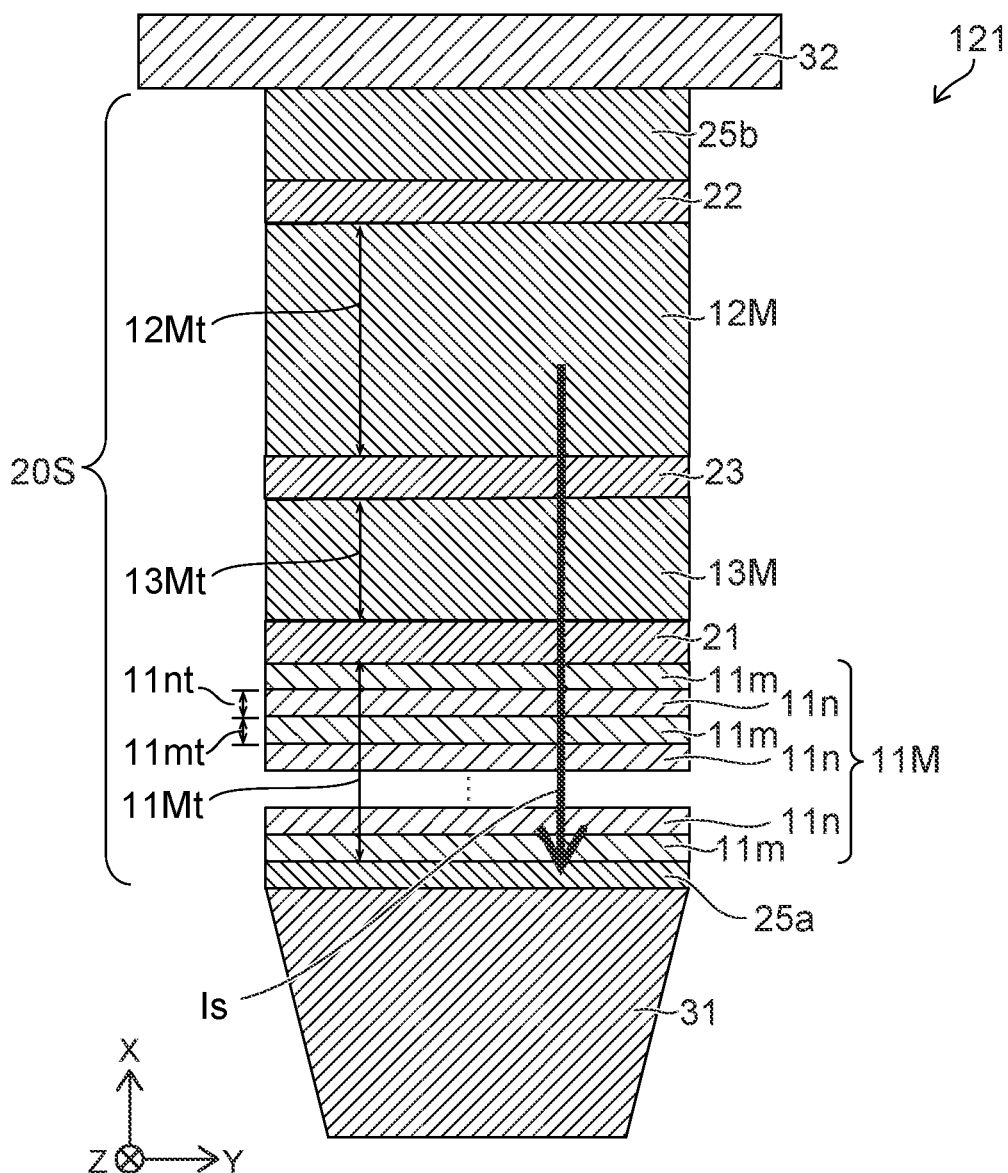
FIG. 7 is a schematic cross-sectional view illustrating a magnetic head according to the second embodiment.

FIG. 7 is a schematic cross-sectional view illustrating a magnetic head according to the second embodiment.

In the magnetic head 121 according to the embodiment as shown in FIG. 7, the stacked body 20S includes the third magnetic member 13M and the third layer 23 in addition to the first magnetic member 11M, the second magnetic member 12M, the first layer 21, and the second layer 22. The configuration of the first magnetic member 11M, the second magnetic member 12M, the first layer 21, and the second layer 22 of the magnetic head 121 may be similar to the configuration of the first magnetic member 11M, the second magnetic member 12M, the first layer 21, and the second layer 22 of the magnetic head 120. Examples of the third magnetic member 13M and the third layer 23 of the magnetic head 121 will now be described.

The third magnetic member 13M is located between the first layer 21 and the second magnetic member 12M. The third layer 23 is located between the third magnetic member 13M and the second magnetic member 12M. The third layer 23 includes Cu. The third layer 23 may be, for example, a Cu layer. As described below, the third layer 23 may include other elements in addition to Cu.

The third magnetic member 13M includes at least one selected from the group consisting of Fe, Co, and Ni. The third magnetic member 13M does not include the second element (at least one selected from the group consisting of Mn, Cr, V, Ti, and Sc). Or, the concentration of the second element included in the third magnetic member 13M is less than the concentration of the second element in the first nonmagnetic region 11n.

In the magnetic head 121, for example, the third magnetic member 13M has positive spin polarization. By providing the third magnetic member 13M and the third layer 23, for example, a more stable oscillation is obtained.

In the magnetic head 121, in addition to Cu, the third layer 23 may include a seventh element that is at least one selected from the group consisting of Pd, Pt, Cr, Ta, Ru, Ni, Fe, Co, Ir, Mo, Ta, Hf, Nb, Mn, Ti, V, and Rh. Because the third layer 23 includes the seventh element, for example, the spin-transfer torque can be suppressed. For example, the spin-transfer torque of the third layer 23 is less than the spin-transfer torque of the first layer 21 and less than the spin-transfer torque of the second layer 22. In the second magnetic member 12M, a more stable oscillation is obtained thereby. For example, a more stable magnetization reversal is obtained in the second magnetic member 12M.

The first layer 21 does not include the seventh element described above. Or, the concentration of the seventh element in the first layer 21 is less than the concentration of the seventh element in the third layer 23. The second layer 22 does not include the seventh element. Or, the concentration of the seventh element in the second layer 22 is less than the concentration of the seventh element in the third layer 23.

As shown in FIG. 7, in the magnetic head 121 as well, the stacked body 20S may include the first-magnetic-pole-side intermediate layer 25a that is located between the first magnetic pole 31 and the first magnetic member 11M. As described above, the first-magnetic-pole-side intermediate layer 25a includes at least one selected from the group consisting of the first material, the second material, and the third material described above. The magnetic coupling between the first magnetic pole 31 and the first magnetic member 11M is effectively blocked.

In the magnetic head 121 as well, the stacked body 20S may include the second-magnetic-pole-side intermediate layer 25b located between the second magnetic member 12M and the second magnetic pole 32. In the magnetic head 121 as well, the second-magnetic-pole-side intermediate layer 25b includes at least one selected from the group consisting of Fe, Co, and Ni.

Examples of the first magnetic member 11M will now be described.

FIGS. 8A to 8D are schematic cross-sectional views illustrating portions of the magnetic recording device according to the embodiment.

Figure 8A:
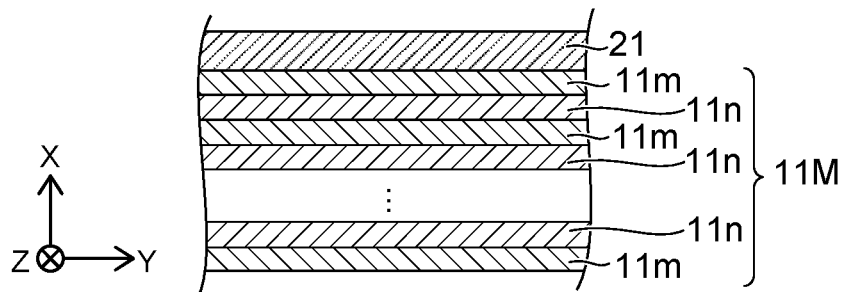
FIGS. 8A to 8D are schematic cross-sectional views illustrating portions of the magnetic recording device according to the embodiment.

As shown in FIG. 8A, the number of the first magnetic regions 11m may be greater than the number of the first nonmagnetic regions 11n. For example, the first layer 21 may contact one of the multiple first magnetic regions 11m.

Figure 8B:
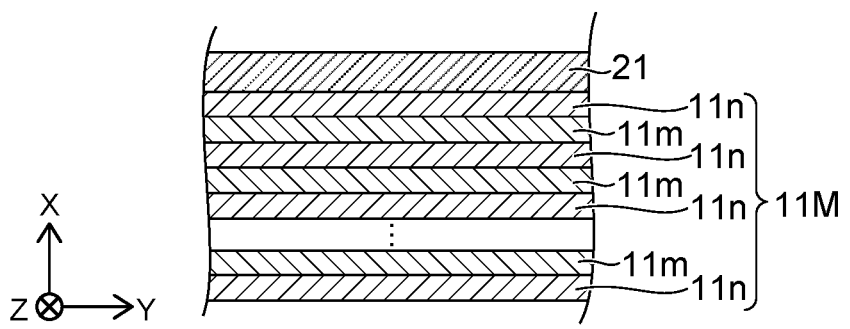

As shown in FIG. 8B, the number of the first nonmagnetic regions 11n may be greater than the number of the first magnetic regions 11m. For example, the first layer 21 may contact the first nonmagnetic region 11n.

Figure 8C:
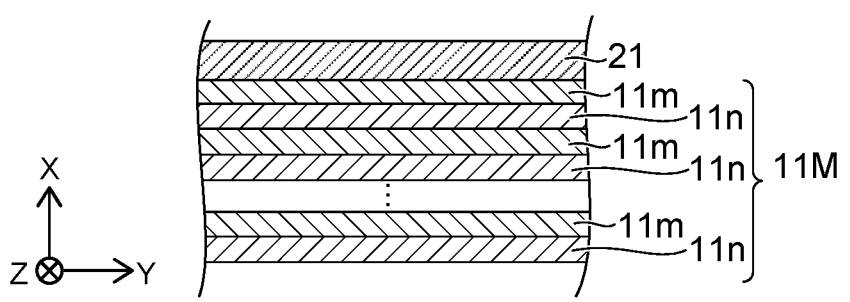
Figure 8D:
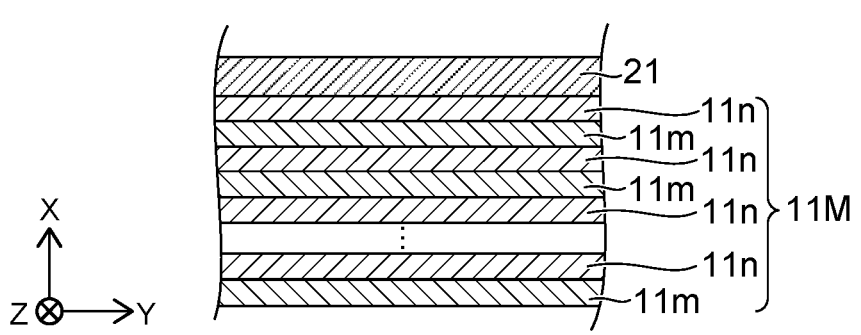

As shown in FIGS. 8C and 8D, the number of the first magnetic regions 11m may be equal to the number of the first nonmagnetic regions 11n. As shown in FIG. 8C, the first layer 21 may contact one of the multiple first magnetic regions 11m. As shown in FIG. 8C, the first layer 21 may contact the first nonmagnetic region 11n.

The configurations of the first magnetic member 11M described with reference to FIGS. 8A to 8D are applicable to at least one of the second magnetic member 12M or the third magnetic member 13M according to the first embodiment.

Figure 9:
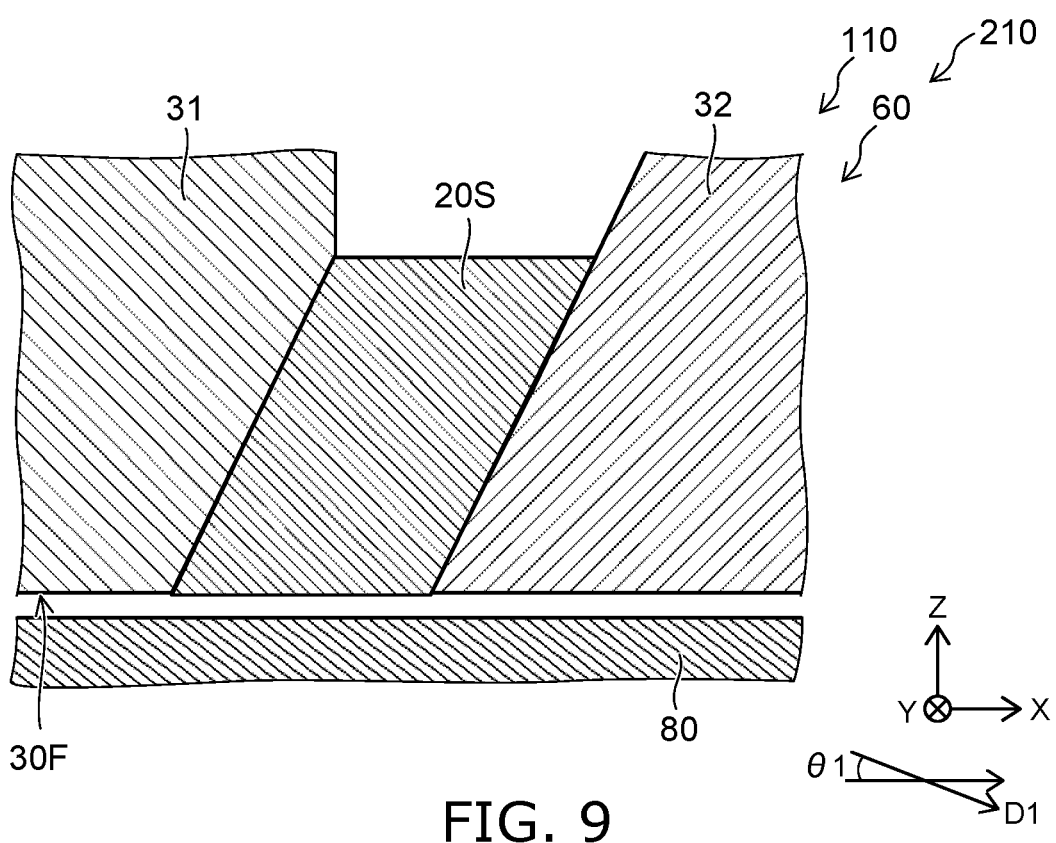
FIG. 9 is a schematic cross-sectional view illustrating a portion of the magnetic recording device according to the embodiment.

FIG. 9 is a schematic cross-sectional view illustrating a portion of the magnetic recording device according to the embodiment.

As shown in FIG. 9, the direction D1 from the first magnetic pole 31 toward the second magnetic pole 32 may be oblique to the X-axis direction. The direction D1 corresponds to the stacking direction of the stacked body 20S. The X-axis direction is along the medium-facing surface 30F of the first magnetic pole 31. The angle between the direction D1 and the medium-facing surface 30F is taken as an angle θ1. The angle θ1 is, for example, not less than 15 degrees and not more than 30 degrees. The angle θ1 may be 0 degrees.

When the direction D1 is oblique to the X-axis direction, the thicknesses of the layers correspond to lengths along the direction D1. The configuration in which the direction D1 is oblique to the X-axis direction is applicable to the embodiments described above.

Several examples relating to the magnetic head and the magnetic recording device according to embodiments will now be described. Examples in which the magnetic head 110 is used are described below.

Figure 10:
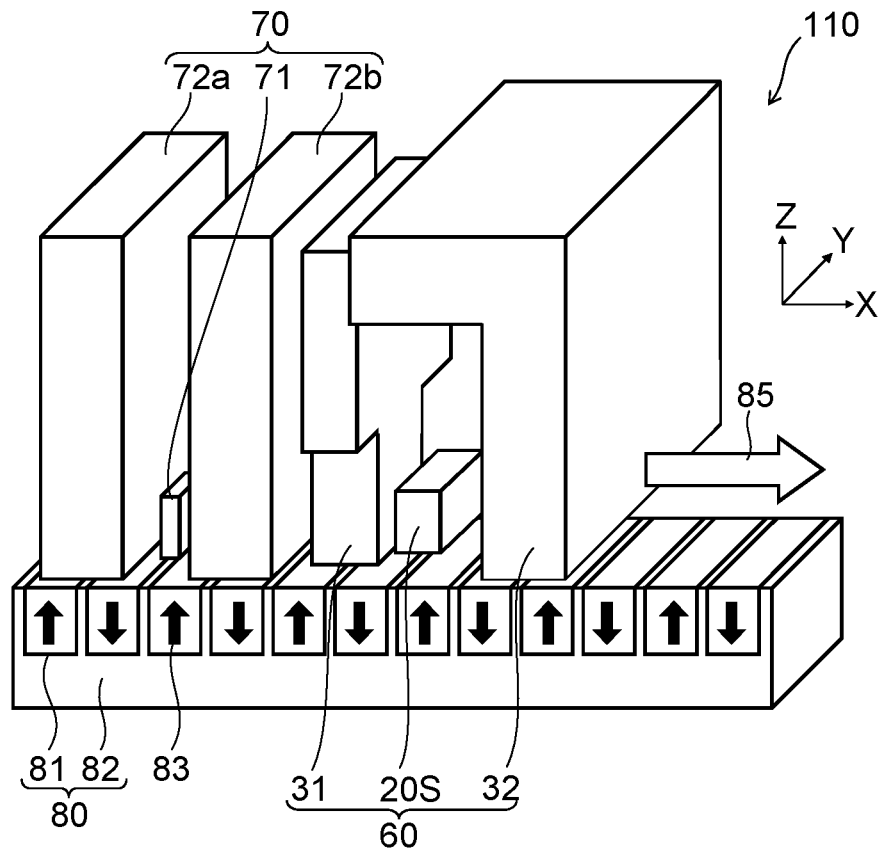
FIG. 10 is a schematic perspective view illustrating the magnetic head according to the embodiment.

FIG. 10 is a schematic perspective view illustrating the magnetic head according to the embodiment.

As shown in FIG. 10, the magnetic head 110 includes, for example, the recording part 60 and a reproducing part 70. Information is recorded in the magnetic recording medium 80 by the recording part 60 of the magnetic head 110. The information that is recorded in the magnetic recording medium 80 is reproduced by the reproducing part 70.

The magnetic recording medium 80 includes, for example, a medium substrate 82, and a magnetic recording layer 81 provided on the medium substrate 82. A magnetization 83 of the magnetic recording layer 81 is controlled by the recording part 60.

The reproducing part 70 includes, for example, a first reproducing shield 72a, a second reproducing shield 72b, and a magnetic reproducing element 71. The magnetic reproducing element 71 is located between the first reproducing shield 72a and the second reproducing shield 72b. The magnetic reproducing element 71 is configured to output a signal corresponding to the magnetization 83 of the magnetic recording layer 81.

As shown in FIG. 10, the magnetic recording medium 80 moves relative to the magnetic head 110 in a medium movement direction 85. The information that corresponds to the magnetization 83 of the magnetic recording layer 81 is controlled by the magnetic head 110 at any position. The information that corresponds to the magnetization 83 of the magnetic recording layer 81 is reproduced by the magnetic head 110 at any position.

Figure 11:
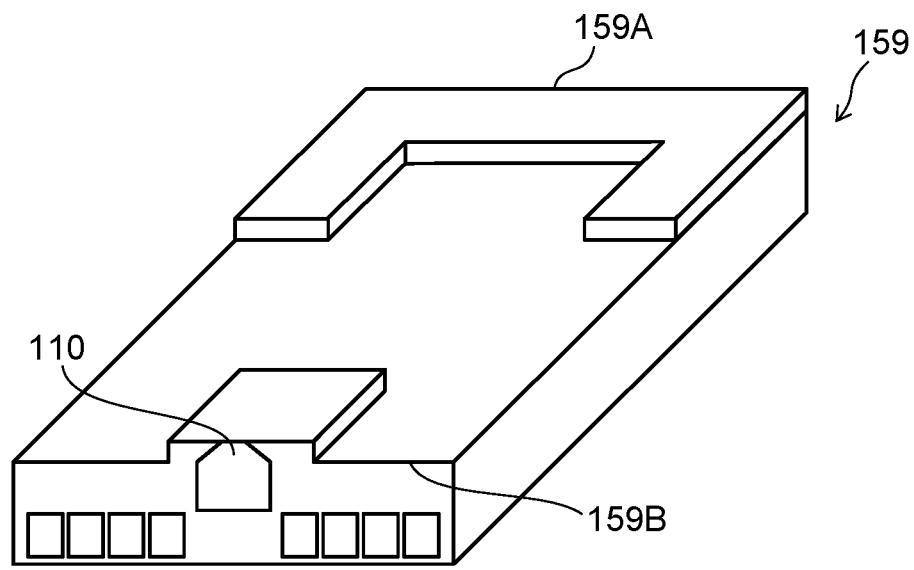
FIG. 11 is a schematic perspective view illustrating a portion of the magnetic recording device according to the embodiment.

FIG. 11 is a schematic perspective view illustrating a portion of the magnetic recording device according to the embodiment.

FIG. 11 illustrates a head slider.

The magnetic head 110 is provided in the head slider 159. The head slider 159 includes, for example, Al₂O₃/TiC, etc. The head slider 159 moves relative to the magnetic recording medium 80 while flying over or contacting the magnetic recording medium 80.

The head slider 159 has, for example, an air inflow side 159A and an air outflow side 159B. The magnetic head 110 is located at the side surface of the air outflow side 159B of the head slider 159 or the like. Thereby, the magnetic head 110 moves relative to the magnetic recording medium while flying over or contacting the magnetic recording medium.

Figure 12:
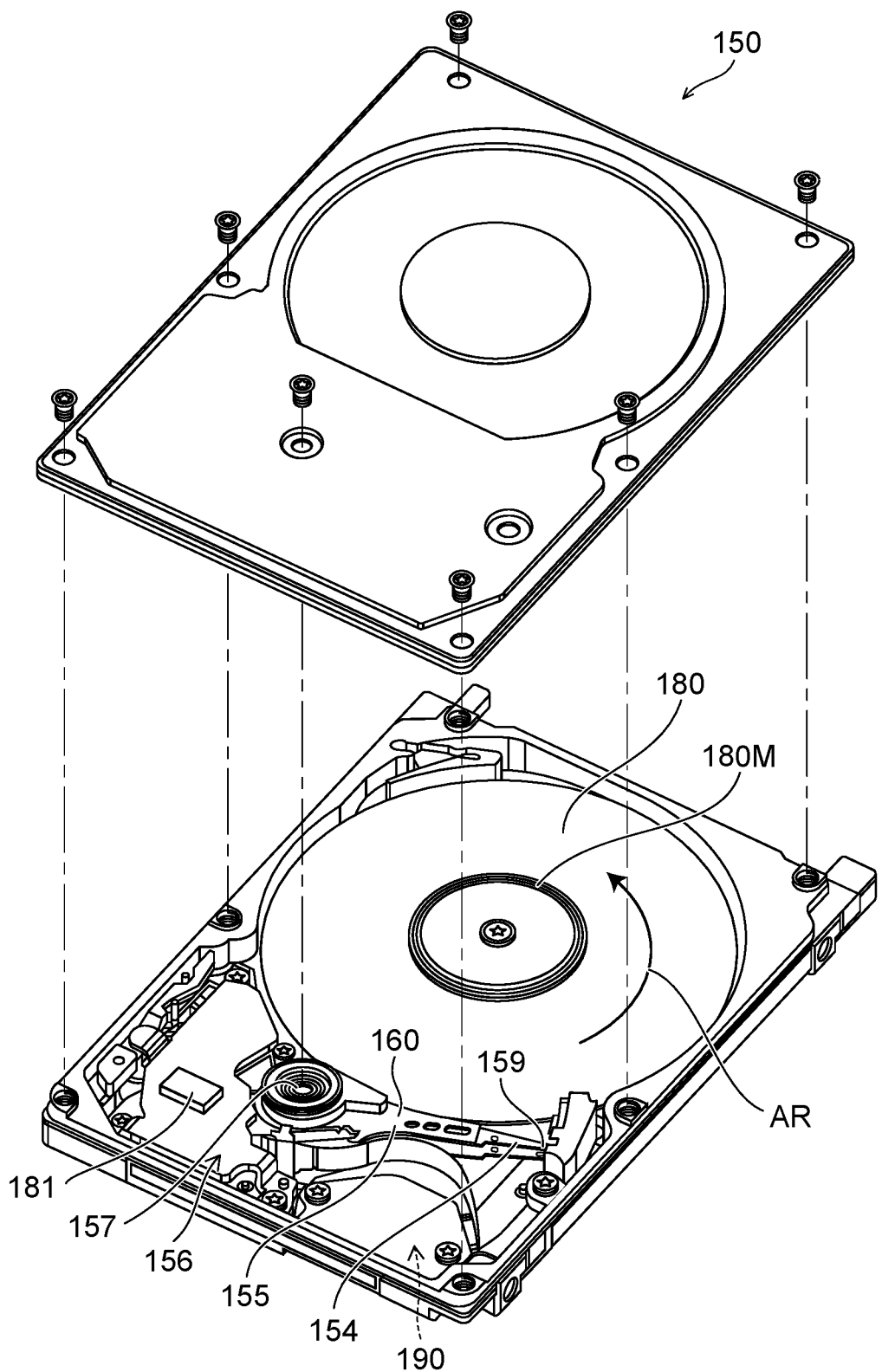
FIG. 12 is a schematic perspective view illustrating a magnetic recording device according to the embodiment.

FIG. 12 is a schematic perspective view illustrating a magnetic recording device according to the embodiment.

Figure 13A:
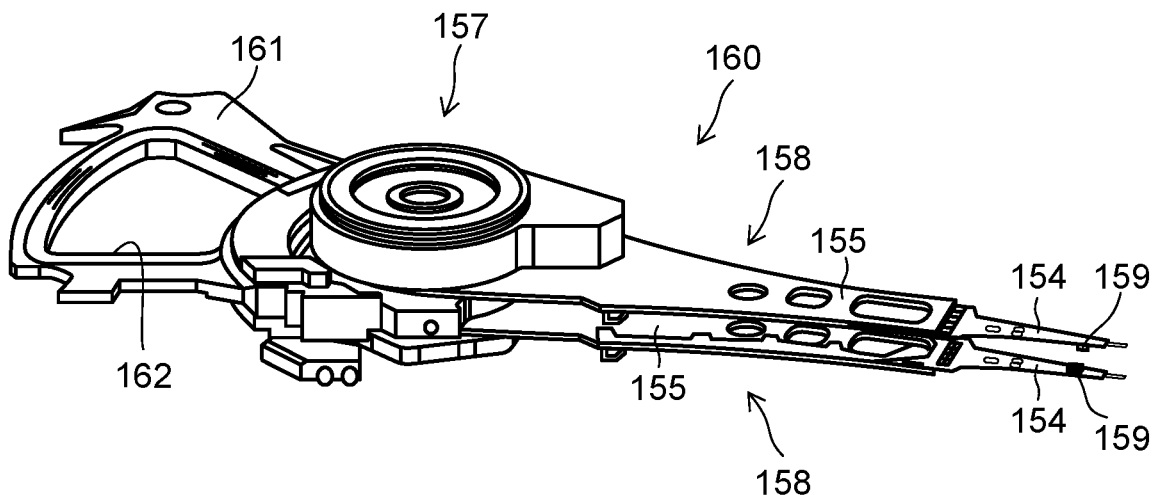
FIGS. 13A and 13B are schematic perspective views illustrating a portion of the magnetic recording device according to the embodiment.
Figure 13B:
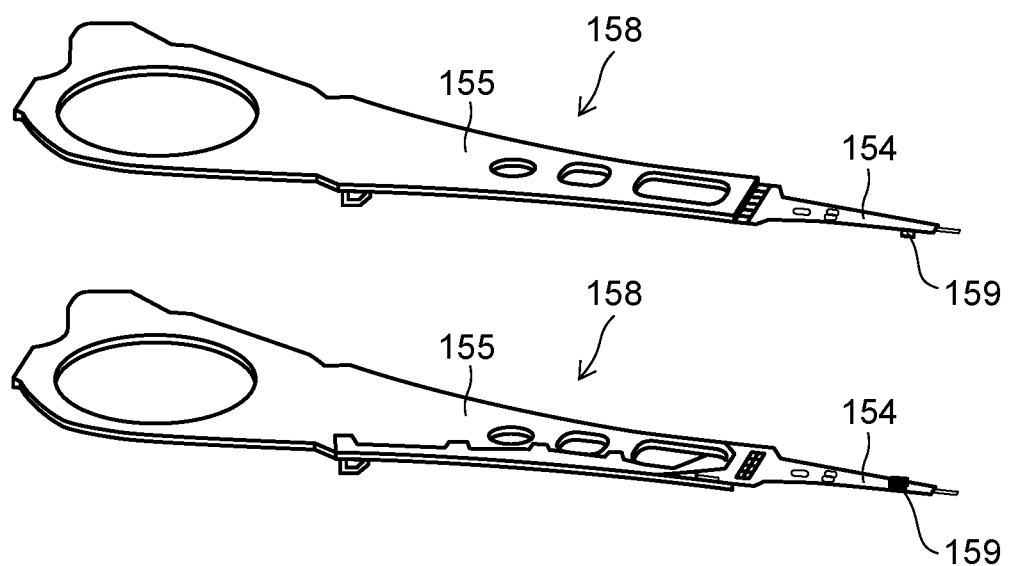

FIGS. 13A and 13B are schematic perspective views illustrating a portion of the magnetic recording device according to the embodiment.

As shown in FIG. 12, a rotary actuator is used in the magnetic recording device 150 according to the embodiment. A recording medium disk 180 is mounted to a spindle motor 180M. The recording medium disk 180 is rotated in the direction of arrow AR by the spindle motor 180M. The spindle motor 180M responds to a control signal from a drive device controller. The magnetic recording device 150 according to the embodiment may include multiple recording medium disks 180. The magnetic recording device 150 may include a recording medium 181. The recording medium 181 is, for example, a SSD (Solid State Drive). The recording medium 181 includes, for example, nonvolatile memory such as flash memory, etc. For example, the magnetic recording device 150 may be a hybrid HDD (Hard Disk Drive).

The head slider 159 records and reproduces the information recorded in the recording medium disk 180. The head slider 159 is provided at the tip of a suspension 154 having a thin-film configuration. The magnetic head (e.g., the magnetic head 110) according to the embodiment is provided at the tip vicinity of the head slider 159.

When the recording medium disk 180 rotates, the downward pressure due to the suspension 154 and the pressure generated by the medium-facing surface (the ABS) of the head slider 159 are balanced. The distance between the medium-facing surface of the head slider 159 and the surface of the recording medium disk 180 becomes a prescribed fly height. According to the embodiment, the head slider 159 may contact the recording medium disk 180. For example, contact-sliding is applicable.

The suspension 154 is connected to one end of an arm 155 (e.g., an actuator arm). The arm 155 includes, for example, a bobbin part, etc. The bobbin part holds a drive coil. A voice coil motor 156 is provided at the other end of the arm 155. The voice coil motor 156 is one type of linear motor. The voice coil motor 156 includes, for example, a drive coil and a magnetic circuit. The drive coil is wound onto the bobbin part of the arm 155. The magnetic circuit includes a permanent magnet and an opposing yoke. The drive coil is located between the permanent magnet and the opposing yoke. The suspension 154 includes one end and another end. The magnetic head (e.g., the magnetic head 110) is provided at the one end of the suspension 154. The arm 155 is connected to the other end of the suspension 154.

The arm 155 is held by ball bearings. The ball bearings are provided at two locations above and below a bearing part 157. The arm 155 can rotate and slide due to the voice coil motor 156. The magnetic head is movable to any position of the recording medium disk 180.

FIG. 13A illustrates the configuration of a portion of the magnetic recording device and is an enlarged perspective view of a head stack assembly 160.

FIG. 13B is a perspective view illustrating a magnetic head assembly (a head gimbal assembly (HGA)) 158 that is a portion of the head stack assembly 160.

As shown in FIG. 13A, the head stack assembly 160 includes the bearing part 157, the head gimbal assembly 158, and a support frame 161. The head gimbal assembly 158 extends from the bearing part 157. The support frame 161 extends from the bearing part 157. The direction in which the support frame 161 extends is the reverse of the direction in which the head gimbal assembly 158 extends. The support frame 161 supports a coil 162 of the voice coil motor 156.

As shown in FIG. 13B, the head gimbal assembly 158 includes the arm 155 extending from the bearing part 157, and the suspension 154 extending from the arm 155.

The head slider 159 is provided at the tip of the suspension 154. The magnetic head (e.g., the magnetic head 110) according to the embodiment is provided in the head slider 159.

The magnetic head assembly (the head gimbal assembly) 158 according to the embodiment includes the magnetic head (e.g., the magnetic head 110) according to the embodiment, the head slider 159 in which the magnetic head is provided, the suspension 154, and the arm 155. The head slider 159 is provided at one end of the suspension 154. The arm 155 is connected to the other end of the suspension 154.

The suspension 154 includes, for example, lead wires (not illustrated) for recording and reproducing signals. The suspension 154 may include, for example, lead wires (not illustrated) for a heater that adjusts the fly height. The suspension 154 may include, for example, lead wire (not illustrated) for an oscillation element, etc. These lead wires are electrically connected to multiple electrodes provided in the magnetic head.

A signal processor 190 is provided in the magnetic recording device 150. The signal processor 190 records and reproduces the signals to and from the magnetic recording medium by using the magnetic head. For example, the signal processor 190 is electrically connected to the magnetic head by the input/output lines of the signal processor 190 being connected to electrode pads of the head gimbal assembly 158.

The magnetic recording device 150 according to the embodiment includes a magnetic recording medium, the magnetic head according to the embodiment, a movable part, a position controller, and a signal processor. The movable part causes the magnetic recording medium and the magnetic head to separate, or causes the magnetic recording medium and the magnetic head to be movable relative to each other in a state of contact. The position controller aligns the magnetic head at a prescribed recording position of the magnetic recording medium. The signal processor records and reproduces the signals to and from the magnetic recording medium by using the magnetic head.

For example, the recording medium disk 180 is used as the magnetic recording medium described above. The movable part described above includes, for example, the head slider 159. The position controller described above includes, for example, the head gimbal assembly 158.

Embodiments may include the following configurations (e.g., technological proposals).

Configuration 1

A magnetic head, comprising:
a first magnetic pole;
a second magnetic pole; and
a stacked body provided between the first magnetic pole and the second magnetic pole,
the stacked body including
a first magnetic member,
a second magnetic member provided between the first magnetic member and the second magnetic pole,
a first layer provided between the first magnetic member and the second magnetic member, the first layer including Cu, and
a second layer provided between the second magnetic member and the second magnetic pole, the second layer including Cu,
the first magnetic member including a plurality of first magnetic regions and a first nonmagnetic region,
a direction from one of the plurality of first magnetic regions toward an other one of the plurality of first magnetic regions being along a first direction from the first magnetic pole toward the second magnetic pole,
the first nonmagnetic region being between the one of the plurality of first magnetic regions and the other one of the plurality of first magnetic regions,
the plurality of first magnetic regions including a first element, the first element being at least one selected from the group consisting of Fe, Co, and Ni,
the first nonmagnetic region including a second element, the second element being at least one selected from the group consisting of Mn, Cr, V, Ti, and Sc,
the first nonmagnetic region not including Cu, or a concentration of Cu included in the first nonmagnetic region being less than a concentration of Cu in the first layer,
the second magnetic member including a plurality of second magnetic regions and a second nonmagnetic region,
a direction from one of the plurality of second magnetic regions toward an other one of the plurality of second magnetic regions being along the first direction,
the second nonmagnetic region being between the one of the plurality of second magnetic regions and the other one of the plurality of second magnetic regions,
the plurality of second magnetic regions including a third element, the third element being at least one selected from the group consisting of Fe, Co, and Ni,
the second nonmagnetic region including a fourth element, the fourth element being at least one selected from the group consisting of Mn, Cr, V, Ti, and Sc,
the second nonmagnetic region not including Cu, or a concentration of Cu included in the second nonmagnetic region being less than a concentration of Cu in the second layer.

Configuration 2

The magnetic head according to Configuration 1, wherein
a plurality of the first nonmagnetic regions is provided,
the one of the plurality of first magnetic regions is between one of the plurality of first nonmagnetic regions and an other one of the plurality of first nonmagnetic regions,
a plurality of the second nonmagnetic regions is provided, and
the one of the plurality of second magnetic regions is between one of the plurality of second nonmagnetic regions and an other one of the plurality of second nonmagnetic regions.

Configuration 3

The magnetic head according to Configuration 1 or 2, wherein
a thickness along the first direction of the first magnetic member is less than a thickness along the first direction of the second magnetic member.

Configuration 4

The magnetic head according to any one of Configurations 1 to 3, wherein
the plurality of first magnetic regions does not include the second element, or a concentration of the second element included in the plurality of first magnetic regions is less than a concentration of the second element in the first nonmagnetic region,
the first nonmagnetic region does not include the first element, or a concentration of the first element included in the first nonmagnetic region is less than a concentration of the first element in the plurality of first magnetic regions,
the plurality of second magnetic regions does not include the fourth element, or a concentration of the fourth element included in the plurality of second magnetic regions is less than a concentration of the fourth element in the second nonmagnetic region, and
the second nonmagnetic region does not include the third element, or a concentration of the third element included in the second nonmagnetic region is less than a concentration of the third element in the plurality of second magnetic regions.

Configuration 5

The magnetic head according to any one of Configurations 1 to 4, wherein
the stacked body includes a second-magnetic-pole-side intermediate layer provided between the second magnetic member and the second magnetic pole, and
the second-magnetic-pole-side intermediate layer includes at least one selected from the group consisting of Fe, Co, and Ni.

Configuration 6

The magnetic head according to any one of Configurations 1 to 5, wherein
the stacked body further includes:
a third magnetic member provided between the first layer and the second magnetic member; and
a third layer provided between the third magnetic member and the second magnetic member, the third layer including Cu,
the third magnetic member includes a plurality of third magnetic regions and a third nonmagnetic region,
a direction from one of the plurality of third magnetic regions toward an other one of the plurality of third magnetic regions is along the first direction, the third nonmagnetic region is between the one of the plurality of third magnetic regions and the other one of the plurality of third magnetic regions, the plurality of third magnetic regions includes a fifth element, the fifth element being at least one selected from the group consisting of Fe, Co, and Ni, the third nonmagnetic region includes a sixth element, the sixth element being at least one selected from the group consisting of Mn, Cr, V, Ti, and Sc, and the third nonmagnetic region does not include Cu, or a concentration of Cu included in the third nonmagnetic region is less than a concentration of Cu in the third layer.

Configuration 7

The magnetic head according to Configuration 6, wherein
a plurality of the third nonmagnetic regions is provided, and the one of the plurality of third magnetic regions is between one of the plurality of third nonmagnetic regions and an other one of the plurality of third nonmagnetic regions.

Configuration 8

The magnetic head according to any one of Configurations 1 to 7, wherein the stacked body further includes a first intermediate nonmagnetic layer provided between the first magnetic pole and the first magnetic member, and the first intermediate nonmagnetic layer includes at least one selected from the group consisting of Ta, Ru, and Cr.

Configuration 9

The magnetic head according to Configuration 8, wherein
a thickness along the first direction of the first intermediate nonmagnetic layer is not less than 1 nm and not more than 7 nm.

Configuration 10

The magnetic head according to any one of Configurations 1 to 5, wherein the stacked body further includes:
a third magnetic member provided between the first layer and the second magnetic member; and
a third layer provided between the third magnetic member and the second magnetic member, the third layer including Cu, the third magnetic member includes at least one selected from the group consisting of Fe, Co, and Ni, and the third magnetic member does not include the second element, or a concentration of the second element included in the third magnetic member is less than a concentration of the second element in the first nonmagnetic region.

Configuration 11

The magnetic head according to Configuration 10, wherein the stacked body includes a first-magnetic-pole-side intermediate layer provided between the first magnetic pole and the first magnetic member, the first-magnetic-pole-side intermediate layer includes at least one selected from the group consisting of a first material, a second material, and a third material, the first material includes an amorphous magnetic substance, the second material includes at least one selected from the group consisting of Ni and Co, and the third material includes at least one selected from the group consisting of Fe, Co, and Ni and includes at least one selected from the group consisting of Pd, Pt, Ir, Ta, Ru, Rh, Mo, W, Zr, Hf, and Nb.

Configuration 12

The magnetic head according to Configuration 11, wherein a thickness along the first direction of the first-magnetic-pole-side intermediate layer is not less than 1 nm and not more than 7 nm.

Configuration 13

The magnetic head according to any one of Configurations 1 to 12, wherein a thickness along the first direction of the one of the plurality of first magnetic regions is not less than 0.15 nm and not more than 1.5 nm, and a thickness along the first direction of the first nonmagnetic region is not less than 0.15 nm and not more than 1.5 nm.

Configuration 14

A magnetic head, comprising:
a first magnetic pole;
a second magnetic pole; and
a stacked body provided between the first magnetic pole and the second magnetic pole,
the stacked body including
a first magnetic member,
a second magnetic member provided between the first magnetic member and the second magnetic pole,
a first layer provided between the first magnetic member and the second magnetic member, the first layer including Cu, and
a second layer provided between the second magnetic member and the second magnetic pole, the second layer including Cu, the first magnetic member including a plurality of first magnetic regions and a first nonmagnetic region, a direction from one of the plurality of first magnetic regions toward an other one of the plurality of first magnetic regions being along a first direction from the first magnetic pole toward the second magnetic pole, the first nonmagnetic region being between the one of the plurality of first magnetic regions and the other one of the plurality of first magnetic regions, the plurality of first magnetic regions including a first element, the first element being at least one selected from the group consisting of Fe, Co, and Ni, the first nonmagnetic region including a second element, the second element being at least one selected from the group consisting of Mn, Cr, V, Ti, and Sc, the first nonmagnetic region not including Cu, or a concentration of Cu included in the first nonmagnetic region being less than a concentration of Cu in the first layer, the second magnetic member including at least one selected from the group consisting of Fe, Co, and Ni.

Configuration 15

The magnetic head according to Configuration 14, wherein a thickness along the first direction of the first magnetic member is less than a thickness along the first direction of the second magnetic member.

Configuration 16

The magnetic head according to Configuration 14 or 15, wherein the plurality of first magnetic regions does not include the second element, or a concentration of the second element included in the plurality of first magnetic regions is less than a concentration of the second element in the first nonmagnetic region, the first nonmagnetic region does not include the first element, or a concentration of the first element included in the first nonmagnetic region is less than a concentration of the first element in the plurality of first magnetic regions, and the second magnetic member does not include the second element, or a concentration of the second element included in the second magnetic member is less than the concentration of the second element in the first nonmagnetic region.

Configuration 17

The magnetic head according to any one of Configurations 14 to 16, wherein the stacked body further includes:
a third magnetic member provided between the first layer and the second magnetic member; and
a third layer provided between the third magnetic member and the second magnetic member, the third layer including Cu,
the third magnetic member includes at least one selected from the group consisting of Fe, Co, and Ni,
the third magnetic member does not include the second element, or a concentration of the second element included in the third magnetic member is less than a concentration of the second element in the first nonmagnetic region.

Configuration 18

The magnetic head according to any one of Configurations 14 to 17, wherein the stacked body includes a second-magnetic-pole-side intermediate layer provided between the second magnetic member and the second magnetic pole, and the second-magnetic-pole-side intermediate layer includes at least one selected from the group consisting of Fe, Co, and Ni.

Configuration 19

The magnetic head according to any one of Configurations 14 to 18, wherein the stacked body includes a first-magnetic-pole-side intermediate layer provided between the first magnetic pole and the first magnetic member, the first-magnetic-pole-side intermediate layer includes at least one selected from the group consisting of a first material, a second material, and a third material, the first material includes an amorphous magnetic substance, the second material includes at least one selected from the group consisting of Ni and Co, and the third material includes at least one selected from the group consisting of Fe, Co, and Ni and includes at least one selected from the group consisting of Pd, Pt, Ir, Ta, Ru, Rh, Mo, W, Zr, Hf, and Nb.

Configuration 20

A magnetic recording device, comprising:
the magnetic head according to any one of Configurations 1 to 19; and
an electrical circuit,
the electrical circuit being configured to supply a current to the magnetic head,
the current having an orientation from the second magnetic member toward the first magnetic member.

According to embodiments, a magnetic head and a magnetic recording device can be provided in which stable operations are possible.

In the specification of the application, "perpendicular" and "parallel" refer to not only strictly perpendicular and strictly parallel but also include, for example, the fluctuation due to manufacturing processes, etc. It is sufficient to be substantially perpendicular and substantially parallel.

Hereinabove, exemplary embodiments of the invention are described with reference to specific examples. However, the embodiments of the invention are not limited to these specific examples. For example, one skilled in the art may similarly practice the invention by appropriately selecting specific configurations of components included in magnetic heads such as magnetic poles, magnetic members, magnetic regions, nonmagnetic regions, stacked bodies, magnetic layers, nonmagnetic layers, etc., from known art. Such practice is included in the scope of the invention to the extent that similar effects thereto are obtained.

Further, any two or more components of the specific examples may be combined within the extent of technical feasibility and are included in the scope of the invention to the extent that the purport of the invention is included.

Moreover, all magnetic heads and magnetic recording devices practicable by an appropriate design modification by one skilled in the art based on the magnetic heads and magnetic recording devices described above as embodiments of the invention also are within the scope of the invention to the extent that the spirit of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:
1. A magnetic head, comprising:
a first magnetic pole;
a second magnetic pole; and
a stacked body provided between the first magnetic pole and the second magnetic pole,
the stacked body including
a first magnetic member,
a second magnetic member provided between the first magnetic member and the second magnetic pole,
a first layer provided between the first magnetic member and the second magnetic member, the first layer including Cu, and
a second layer provided between the second magnetic member and the second magnetic pole, the second layer including Cu,
the first magnetic member including a plurality of first magnetic regions and a first nonmagnetic region,
a direction from one of the first magnetic regions toward an other one of the first magnetic regions being along a first direction from the first magnetic pole toward the second magnetic pole,
the first nonmagnetic region being between the one of the first magnetic regions and the other one of the first magnetic regions,
the first magnetic regions including a first element, the first element being at least one selected from the group consisting of Fe, Co, and Ni,
the first nonmagnetic region including a second element, the second element being at least one selected from the group consisting of Mn, Cr, V, Ti, and Sc, the first nonmagnetic region not including Cu, or a concentration of Cu included in the first nonmagnetic region being less than a concentration of Cu in the first layer, the second magnetic member including a plurality of second magnetic regions and a second nonmagnetic region, a direction from one of the second magnetic regions toward an other one of the second magnetic regions being along the first direction, the second nonmagnetic region being between the one of the second magnetic regions and the other one of the second magnetic regions, the second magnetic regions including a third element, the third element being at least one selected from the group consisting of Fe, Co, and Ni, the second nonmagnetic region including a fourth element, the fourth element being at least one selected from the group consisting of Mn, Cr, V, Ti, and Sc, and the second nonmagnetic region not including Cu, or a concentration of Cu included in the second nonmagnetic region being less than a concentration of Cu in the second layer, wherein a thickness along the first direction of the first magnetic member is less than a thickness along the first direction of the second magnetic member.

2. The head according to claim 1, wherein
a plurality of the first nonmagnetic regions is provided,
the one of the first magnetic regions is between one of the first nonmagnetic regions and an other one of the first nonmagnetic regions,
a plurality of the second nonmagnetic regions is provided, and
the one of the second magnetic regions is between one of the second nonmagnetic regions and an other one of the second nonmagnetic regions.

3. The head according to claim 1, wherein
the first magnetic regions do not include the second element, or a concentration of the second element included in the first magnetic regions is less than a concentration of the second element in the first nonmagnetic region,
the first nonmagnetic region does not include the first element, or a concentration of the first element included in the first nonmagnetic region is less than a concentration of the first element in the first magnetic regions,
the second magnetic regions do not include the fourth element, or a concentration of the fourth element included in the second magnetic regions is less than a concentration of the fourth element in the second nonmagnetic region, and
the second nonmagnetic region does not include the third element, or a concentration of the third element included in the second nonmagnetic region is less than a concentration of the third element in the second magnetic regions.

4. The head according to claim 1, wherein
the stacked body includes a second-magnetic-pole-side intermediate layer provided between the second magnetic member and the second magnetic pole, and
the second-magnetic-pole-side intermediate layer includes at least one selected from the group consisting of Fe, Co, and Ni.

5. The head according to claim 1, wherein
the stacked body further includes:
a third magnetic member provided between the first layer and the second magnetic member; and
a third layer provided between the third magnetic member and the second magnetic member, the third layer including Cu,
the third magnetic member includes a plurality of third magnetic regions and a third nonmagnetic region,
a direction from one of the third magnetic regions toward an other one of the third magnetic regions is along the first direction,
the third nonmagnetic region is between the one of the third magnetic regions and the other one of the third magnetic regions,
the third magnetic regions include a fifth element, the fifth element being at least one selected from the group consisting of Fe, Co, and Ni,
the third nonmagnetic region includes a sixth element, the sixth element being at least one selected from the group consisting of Mn, Cr, V, Ti, and Sc, and
the third nonmagnetic region does not include Cu, or a concentration of Cu included in the third nonmagnetic region is less than a concentration of Cu in the third layer.

6. The head according to claim 5, wherein
a plurality of the third nonmagnetic regions is provided, and
the one of the third magnetic regions is between one of the third nonmagnetic regions and an other one of the third nonmagnetic regions.

7. The head according to claim 1, wherein
the stacked body further includes a first intermediate nonmagnetic layer provided between the first magnetic pole and the first magnetic member, and
the first intermediate nonmagnetic layer includes at least one selected from the group consisting of Ta, Ru, and Cr.

8. The head according to claim 7, wherein a thickness along the first direction of the first intermediate nonmagnetic layer is not less than 1 nm and not more than 7 nm.

9. The head according to claim 1, wherein
the stacked body further includes:
a third magnetic member provided between the first layer and the second magnetic member; and
a third layer provided between the third magnetic member and the second magnetic member, the third layer including Cu,
the third magnetic member includes at least one selected from the group consisting of Fe, Co, and Ni, and
the third magnetic member does not include the second element, or a concentration of the second element included in the third magnetic member is less than a concentration of the second element in the first nonmagnetic region.

10. The head according to claim 9, wherein
the stacked body includes a first-magnetic-pole-side intermediate layer provided between the first magnetic pole and the first magnetic member,
the first-magnetic-pole-side intermediate layer includes at least one selected from the group consisting of a first material, a second material, and a third material,
the first material includes an amorphous magnetic substance,
the second material includes at least one selected from the group consisting of Ni and Co, and
the third material includes at least one selected from the group consisting of Fe, Co, and Ni and includes at least one selected from the group consisting of Pd, Pt, Ir, Ta, Ru, Rh, Mo, W, Zr, Hf, and Nb.

11. The head according to claim 10, wherein a thickness along the first direction of the first-magnetic-pole-side intermediate layer is not less than 1 nm and not more than 7 nm.

12. The head according to claim 1, wherein
a thickness along the first direction of the one of the first magnetic regions is not less than 0.15 nm and not more than 1.5 nm, and
a thickness along the first direction of the first nonmagnetic region is not less than 0.15 nm and not more than 1.5 nm.

13. A magnetic recording device, comprising:
the magnetic head according to claim 1; and
an electrical circuit,
the electrical circuit being configured to supply a current to the magnetic head, and
the current having an orientation from the second magnetic member toward the first magnetic member.

* * * * *